United States Patent
Nakata

(10) Patent No.: US 8,774,616 B2
(45) Date of Patent: Jul. 8, 2014

(54) CAMERA SYSTEM AND INTERCHANGEABLE LENS

(75) Inventor: Koichi Nakata, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/602,688

(22) Filed: Sep. 4, 2012

(65) Prior Publication Data

US 2013/0064533 A1    Mar. 14, 2013

(30) Foreign Application Priority Data

Sep. 9, 2011   (JP) ................................. 2011-196689

(51) Int. Cl.
*G03B 17/00*   (2006.01)

(52) U.S. Cl.
USPC .............. 396/76; 396/103; 396/131; 396/439

(58) Field of Classification Search
USPC ........... 396/76, 103, 131, 218, 223, 237–239
See application file for complete search history.

(56) References Cited

U.S. PATENT DOCUMENTS

| | | |
|---|---|---|
| 2008/0267607 A1 | 10/2008 | Mori |
| 2010/0134676 A1 | 6/2010 | Miyanishi |
| 2013/0188062 A1 * | 7/2013 | Konicek ................ 348/207.1 |

FOREIGN PATENT DOCUMENTS

| | | | | |
|---|---|---|---|---|
| JP | 2005-266656 | | 9/2005 | |
| JP | 2008-268726 | | 11/2008 | |
| JP | 2009-169266 | | 7/2009 | |
| JP | 2010-134077 | | 6/2010 | |
| JP | 2013-145944 | * | 7/2013 | ............. H04N 5/225 |

* cited by examiner

*Primary Examiner* — Christopher Mahoney
(74) *Attorney, Agent, or Firm* — John C. Pokotylo; Straub & Pokotylo

(57) ABSTRACT

The present invention provides an interchangeable lens mounted on a camera body in an exchangeable manner, and the interchangeable lens includes: an optical system in which a state of a subject light flux incident to the mounted camera body is adjustable by changing an optical state; a contact position detecting unit with a detection plane, which detects a contact state including a contact and a contact position of a finger of a photographer, to detect a change in a contact position on the detection plane in an approximately same direction as an optical axis direction of the optical system; and a lens controller to control an optical state of the optical system according to a contact state of the finger including the contact position detected by the contact position detecting unit.

14 Claims, 32 Drawing Sheets

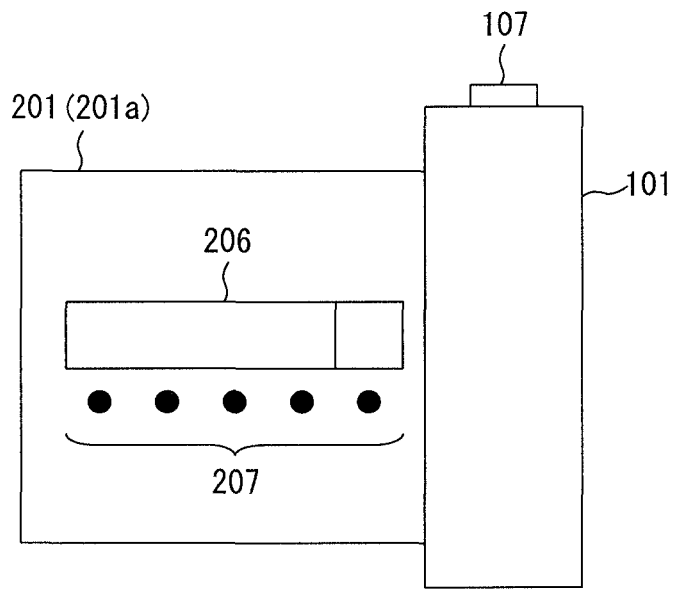
F I G. 1
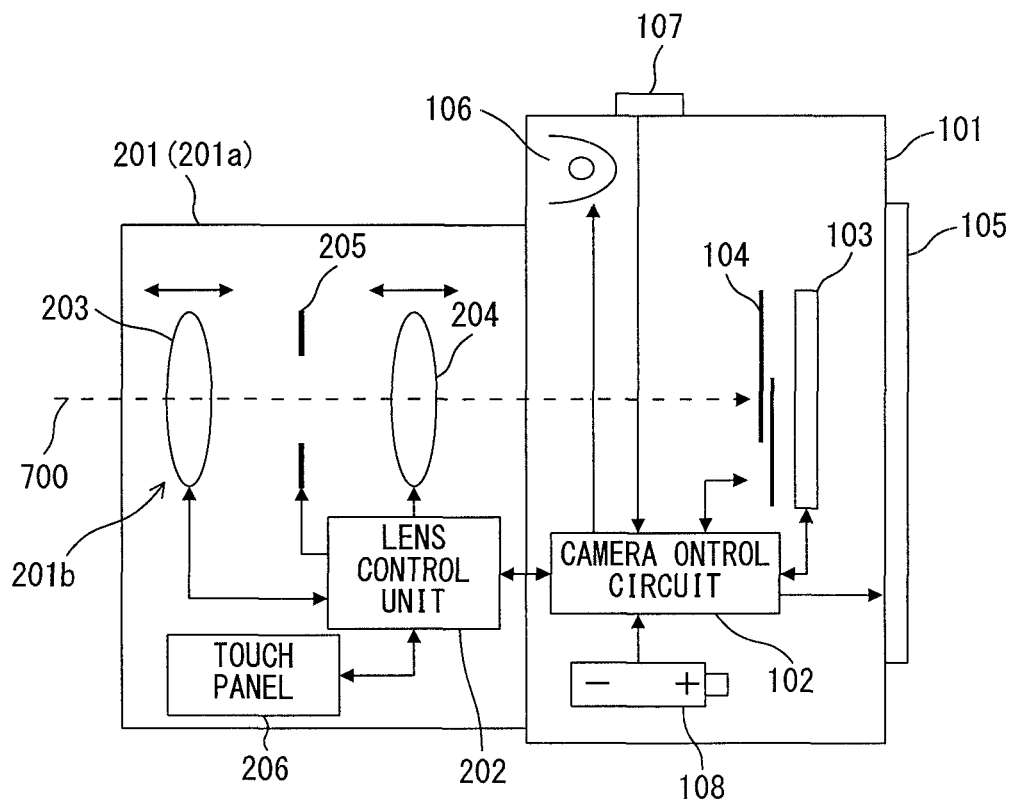
F I G. 2

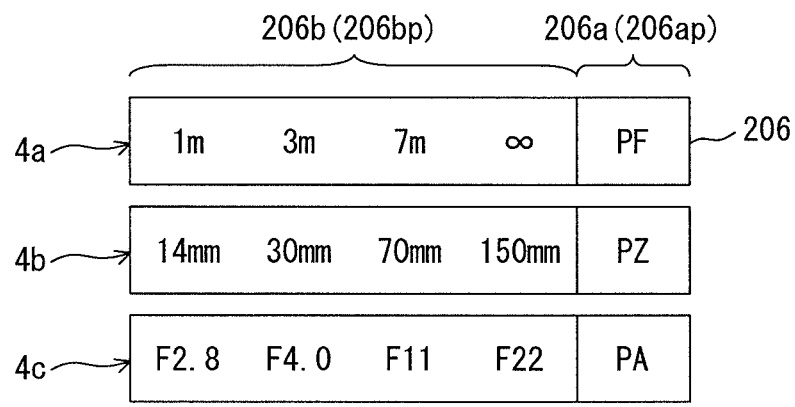
F I G. 4
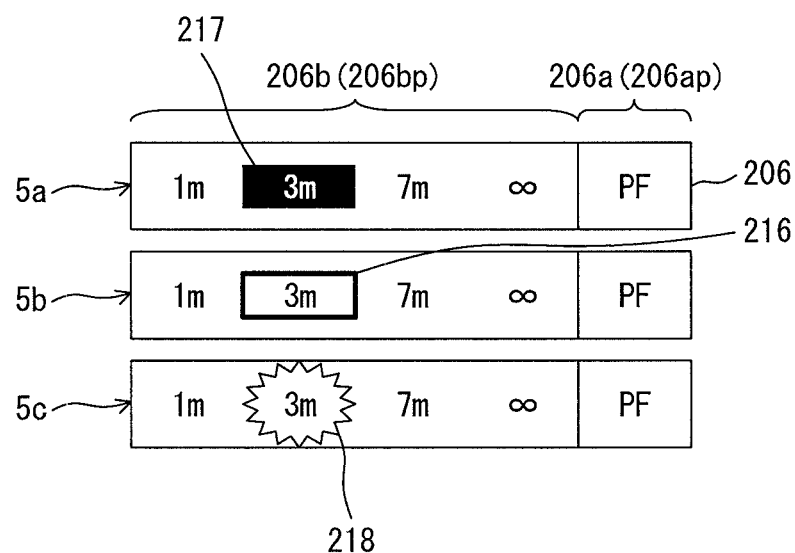
F I G. 5

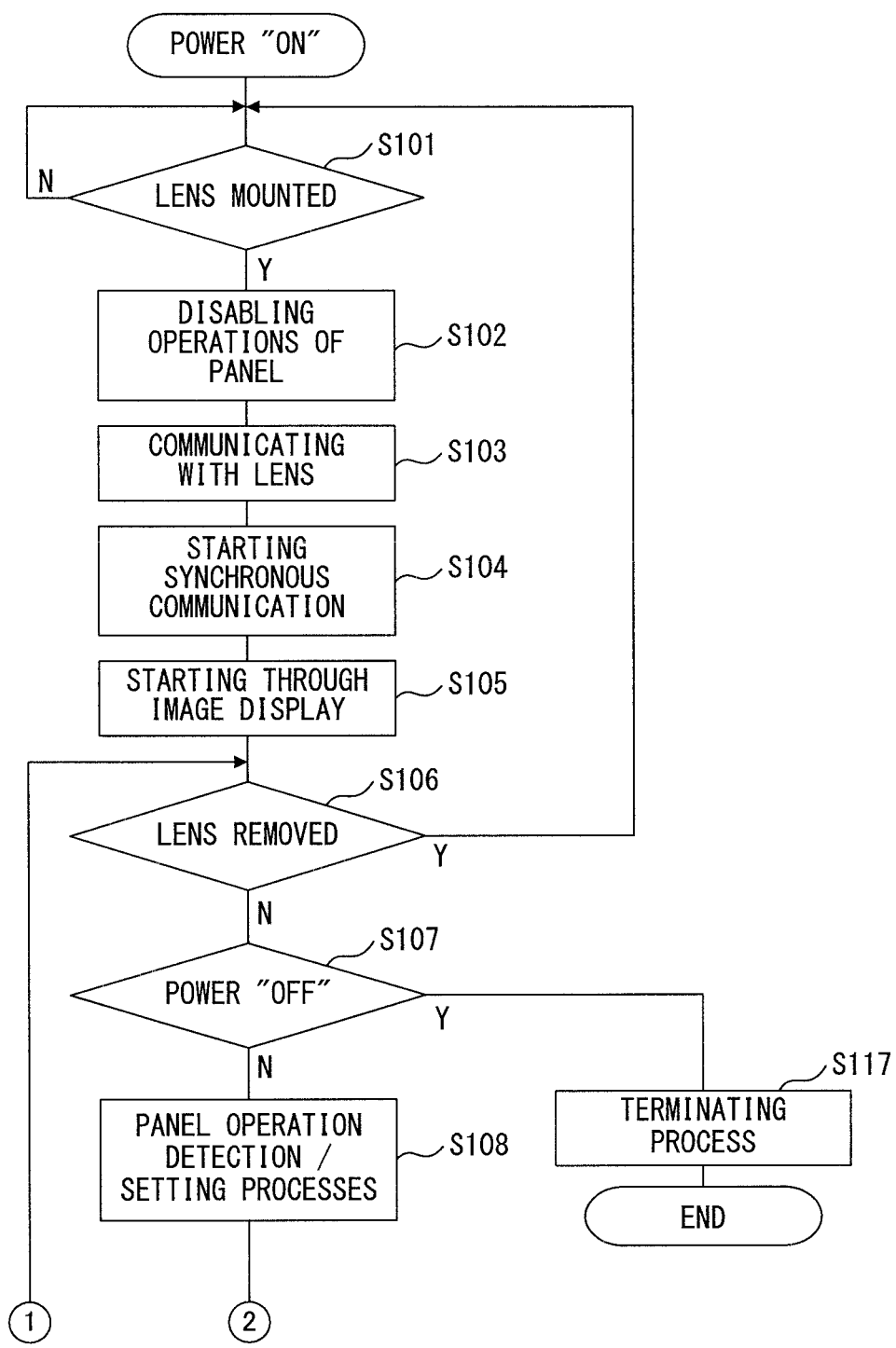
F I G. 1 1 A

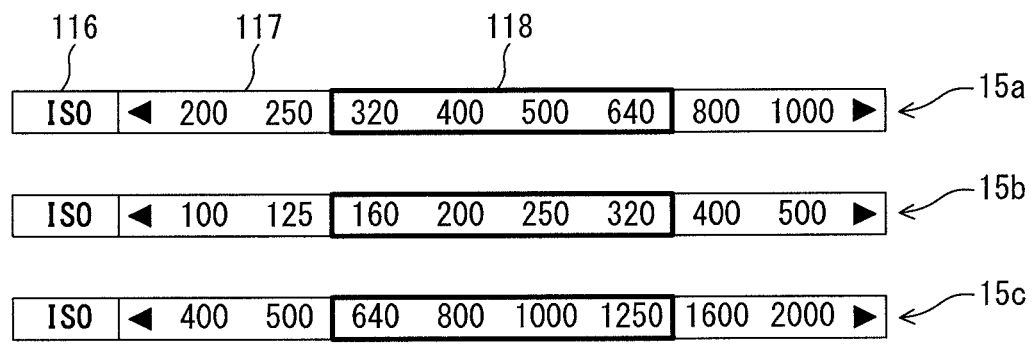
F I G. 1 5
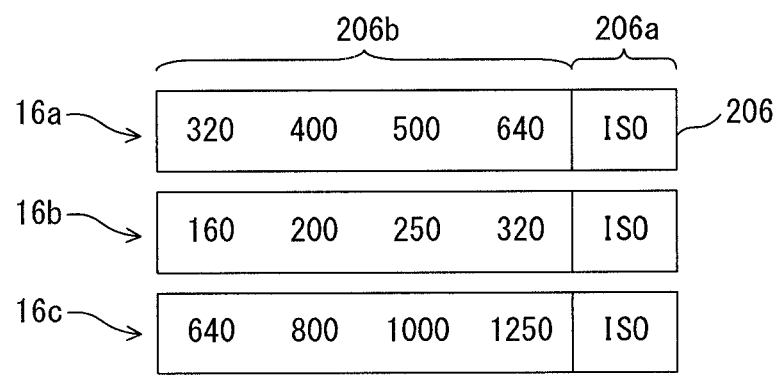
F I G. 1 6

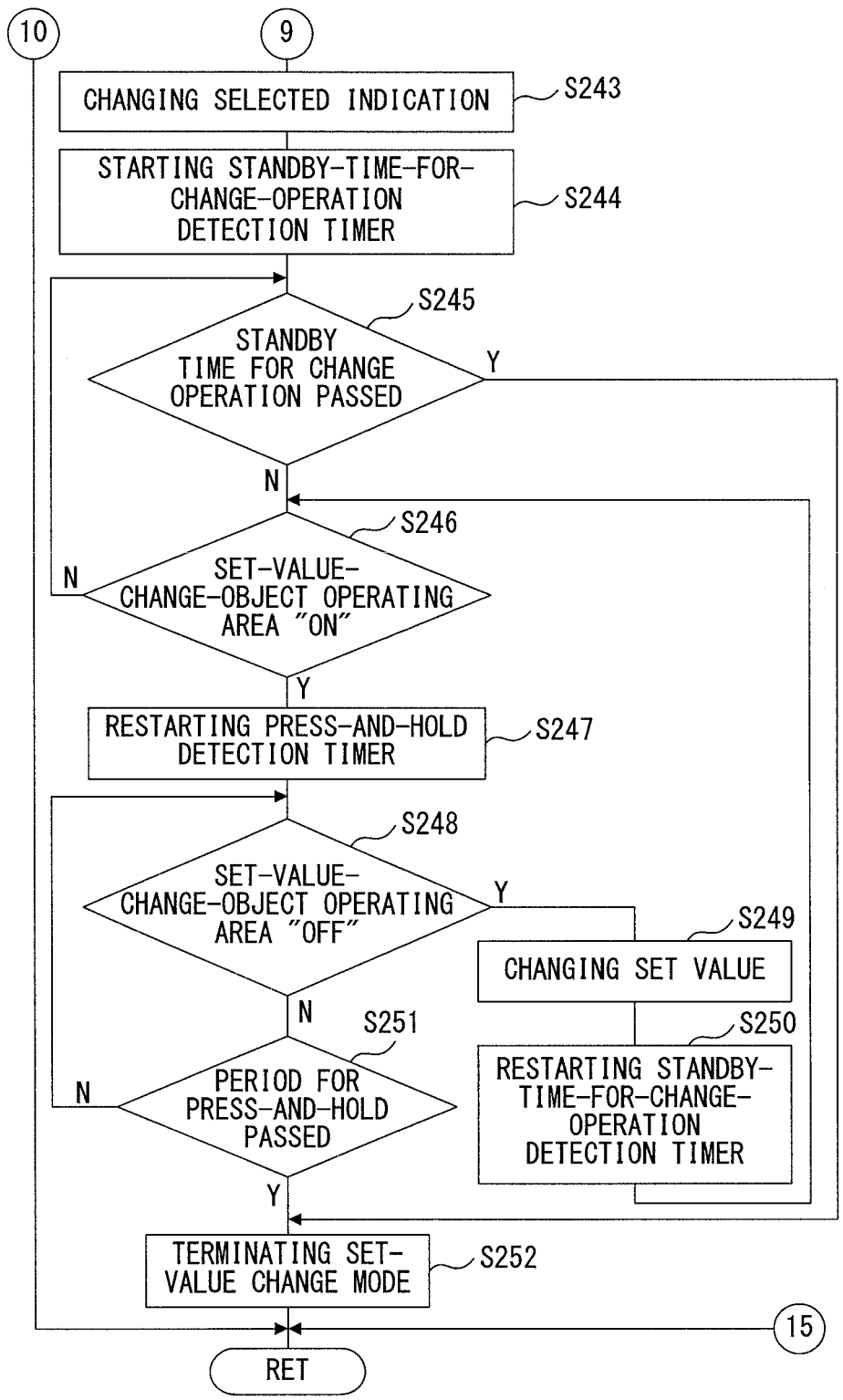
F I G. 1 7 B

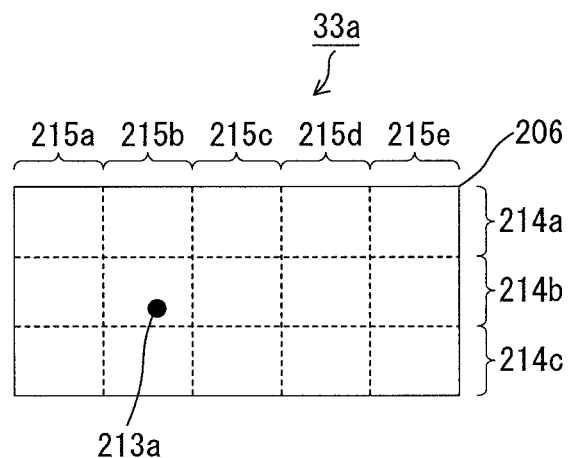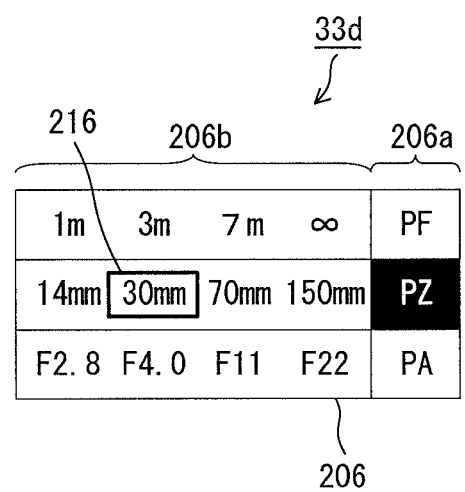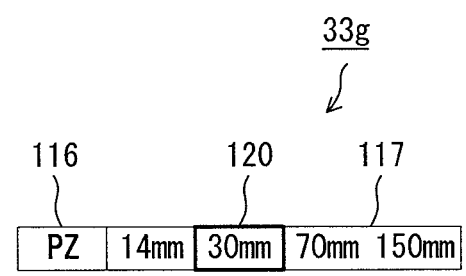
F I G. 18 A

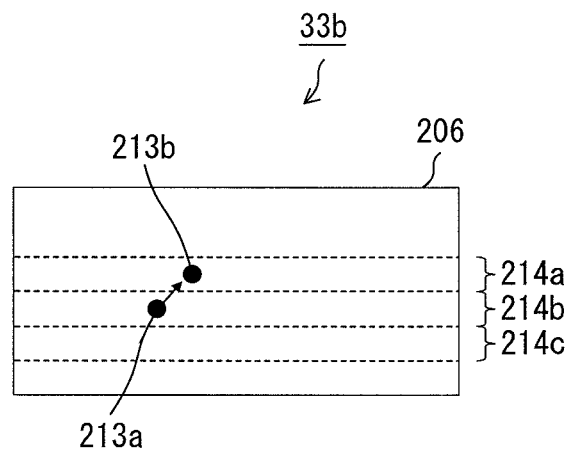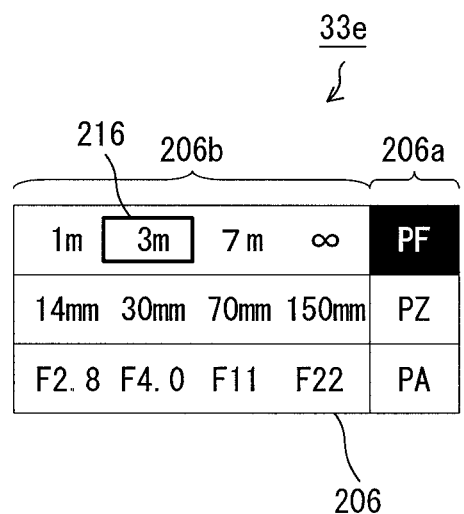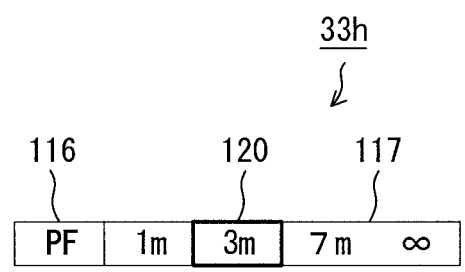
FIG. 18B

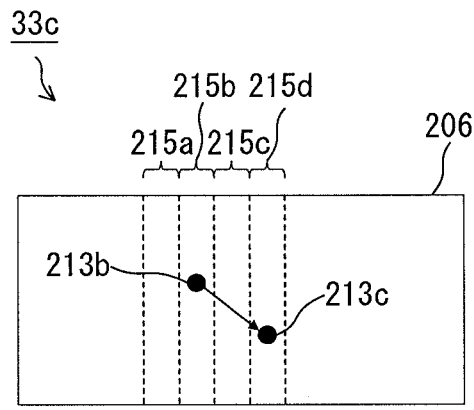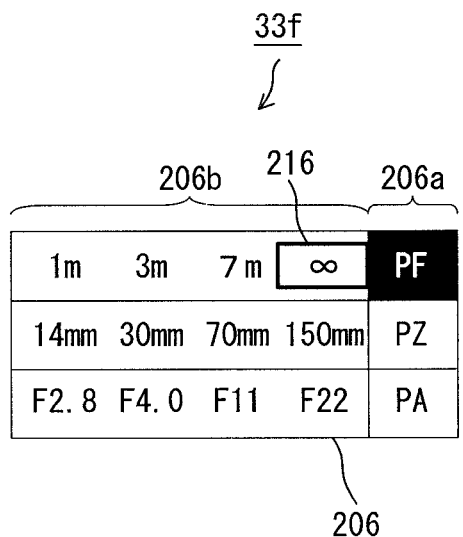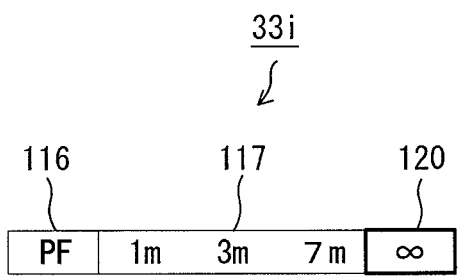
F I G. 1 8 C

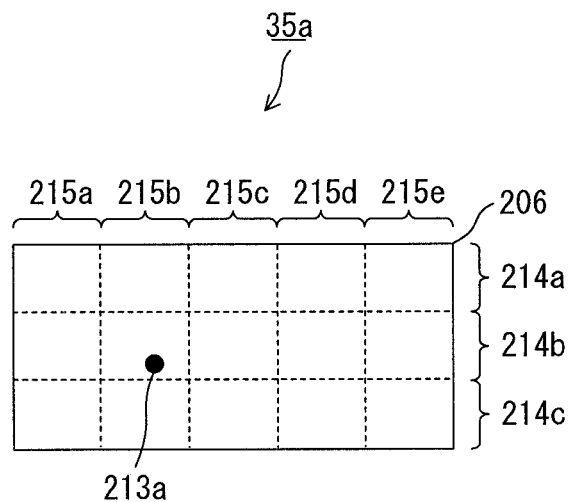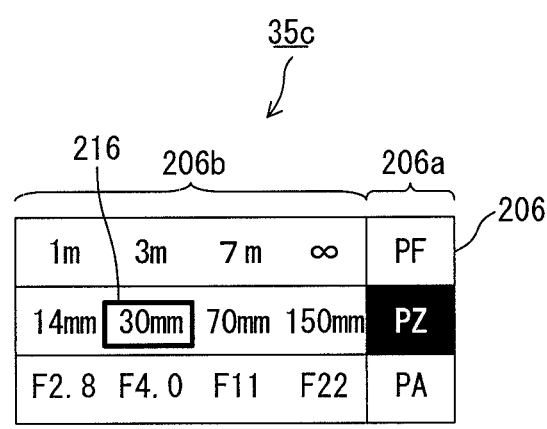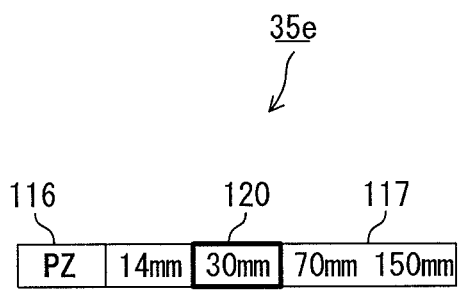
FIG. 20A

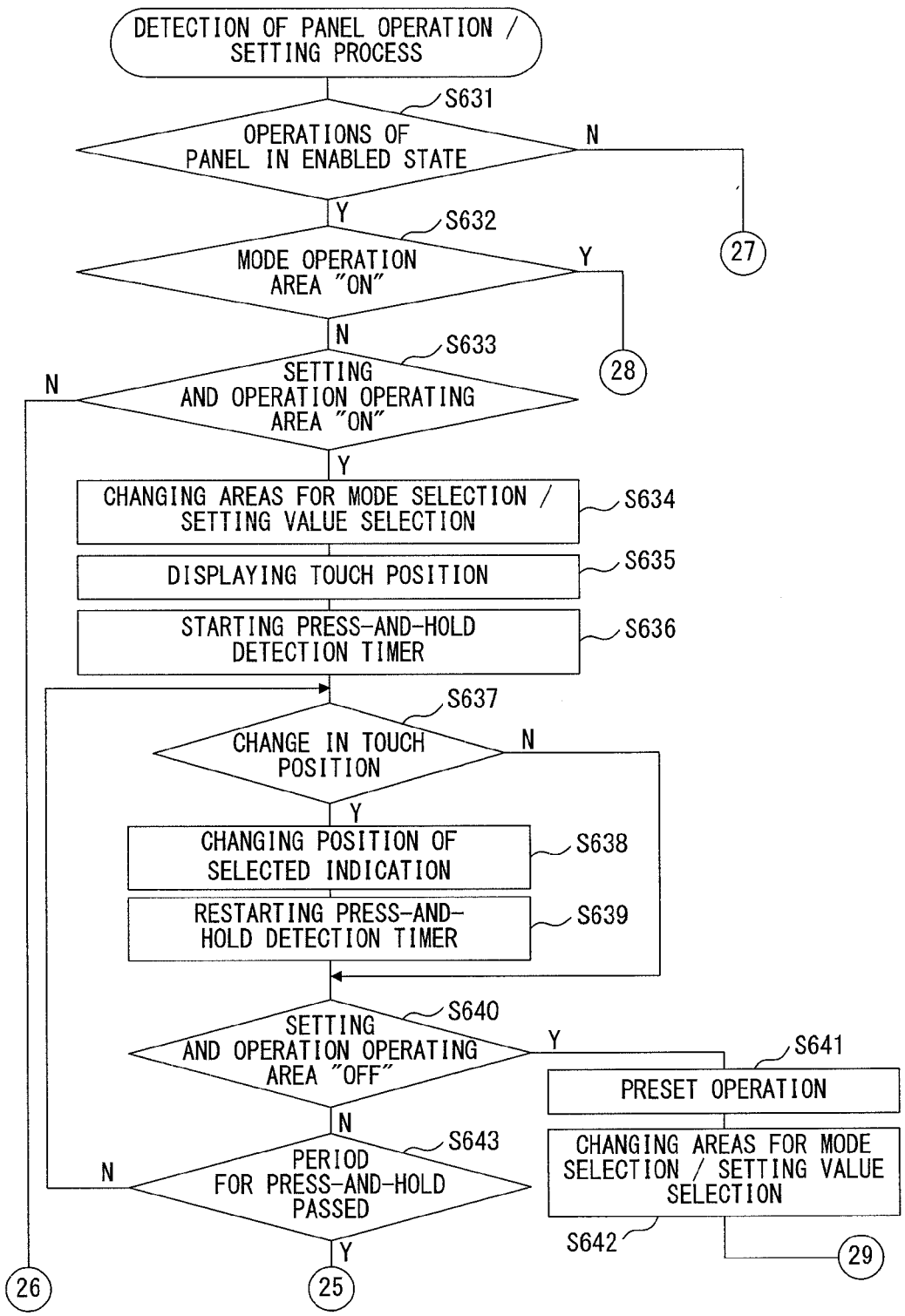
F I G. 21A

CAMERA SYSTEM AND INTERCHANGEABLE LENS

CROSS-REFERENCE TO RELATED APPLICATIONS

This application is based upon and claims the benefit of priority from the prior Japanese Patent Application No. 2011-196689, filed Sep. 9, 2011, the entire contents of which are incorporated herein by reference.

BACKGROUND OF THE INVENTION

1. Field of the Invention

The present invention relates to a camera system and an interchangeable lens.

2. Description of the Related Art

In recent years, video equipments are significantly developing. Also in the field of cameras, the variety of capturing functions is increasing year by year, and functions operable by a photographer are increasing. Moreover, various types of methods are provided for the operation functions. For example, an operating method related to the preset operations of driving a focusing lens or a zoom lens inside the interchangeable lens to a preliminarily registered specific position by operating buttons or dials provided for an interchangeable lens, as disclosed in Patent Document 1, and a method related to manual focus (power focus) operations in which a touch sensor is provided in stead of a manual focus ring that is usually provided on the periphery of a general interchangeable lens barrel and the focusing lens within the interchangeable lens is driven according to the moving direction, amount of movement, and moving speed of a finger detected by the touch sensor, as disclosed in Patent Document 2, have been proposed. Moreover, due to the downsized cameras and the up-sized rear monitor of the cameras, several methods in which a touch panel provided on the rear monitor is used as operation means have been proposed. As disclosed in Patent Document 3 and Patent Document 4, methods are proposed in which the operable items and operable range on a touch panel are restricted when using a viewfinder, where the fact that the touch panel operations on the rear monitor become inconvenient when using a viewfinder is taken into consideration.

PATENT DOCUMENTS

[Patent Document 1] Japanese Patent No. 4590891
[Patent Document 2] Japanese Laid-open Patent Publication No. 2009-169266
[Patent Document 3] Japanese Laid-open Patent Publication No. 2008-268726
[Patent Document 4] Japanese Laid-open Patent Publication No. 2010-134077

SUMMARY OF THE INVENTION

It is an object in one aspect of the present invention to provide a technique in which the operability of various types of functional operations of a camera during the capturing operation is improved without causing mechanical operational noise or swing of the shooting screen.

According to the first aspect of the present invention, an interchangeable lens mounted on a camera body in an exchangeable manner is provided, and the interchangeable lens includes: an optical system in which a state of a subject light flux incident to the mounted camera body is adjustable by changing an optical state; a contact position detecting unit with a detection plane, which detects a contact state including a contact and a contact position of a finger of a photographer, to detect a change in a contact position on the detection plane in an approximately same direction as an optical axis direction of the optical system; and a lens controller to control an optical state of the optical system according to a contact state of the finger including the contact position detected by the contact position detecting unit.

According to the second aspect of the present invention, an interchangeable lens mounted on a camera body in an exchangeable manner is provided, and the interchangeable lens includes: an optical system in which a state of a subject light flux incident to the mounted camera body is adjustable; a lens communication unit to communicate with the camera body; a contact position detecting unit with a detection plane, which detects a contact state including a contact and a contact position of a finger of a photographer, to detect a change in a contact position on the detection plane in an approximately same direction as an optical axis direction of the optical system; and a lens controller to control the lens communication unit to obtain capture control information from the camera body, to change the capture control information according to a contact state of the finger including the contact position detected by the contact position detecting unit, and to control the lens communication unit to transmit the changed capture control information to the camera body.

According to the third aspect of the present invention, a camera system including a camera body and an interchangeable lens mounted on the camera body in an exchangeable manner is provided, and the interchangeable lens includes: an optical system in which a state of a subject light flux incident to the mounted camera body is adjustable by changing an optical state; a lens communication unit to communicate with the camera body; a contact position detecting unit to detect a contact and a contact position of a finger of a photographer; and a lens controller to perform at least one of a control operation of the optical system according to a contact state of the finger including the contact position detected by the contact position detecting unit and a transmission operation of optical system control information to the camera body by the lens communication unit, or a change operation of capture control information according to the contact state and a transmission operation of the capture control information to the camera body by the lens communication unit, and the camera body includes: a main body storage unit to store the optical system control information or the capture control information; a main body communication unit to communicate with the interchangeable lens; and a main body controller to store in the main body storage unit the optical system control information or the capture control information obtained by the main body communication unit.

According to the present invention, it is possible to provide a technique in which the operability of various types of functional operations of a camera during the capturing operation is improved without causing mechanical operational noise or swing of the shooting screen.

BRIEF DESCRIPTION OF THE DRAWINGS

FIG. 1 is a schematic diagram of the side view of a camera system in which an interchangeable lens according to embodiment 1 of the present invention is mounted on a camera body.

FIG. 2 is an outline of the configuration in which an interchangeable lens according to the present invention is mounted on a camera body.

FIG. 4 illustrates an example of the touch panel display of an interchangeable lens according to embodiment 1 of the present invention.

FIG. 5 depicts an example of the selection state indication of preset values on the touch panel of an interchangeable lens according to embodiment 1 of the present invention.

FIGS. 11A, 11B are a flowchart explaining an example of the capturing operations of a camera equipped with an interchangeable lens according to the present invention.

FIG. 15 depicts an example of the process of changing the capture setup display within the range of one-touch selection on the rear monitor of the camera body according to Embodiment 2 of the present invention.

FIG. 16 depicts an example of the touch panel display when the one-touch selectable capture setting is changed by a slide operation on a touch panel of an interchangeable lens according to Embodiment 2 of the present invention.

FIGS. 17A, 17B, 17C, 17D are a flowchart illustrating an example of the operations related to the operation of capture setting selection by an interchangeable lens according to Embodiment 2 of the present invention.

FIGS. 18A, 18B, 18C depict an example of the touch position detection area and the display on the touch panel of an interchangeable lens according to Embodiment 3 of the present invention.

FIGS. 20A, 20B depict an example of the touch position detection area and the display on the touch panel of an interchangeable lens according to Embodiment 4 of the present invention.

FIGS. 21A, 21B, 21C are flowcharts explaining an example of the processes related to preset operations of an interchangeable lens according to embodiment 4 of the present invention.

DETAILED DESCRIPTION OF THE EMBODIMENTS

Figure 3:
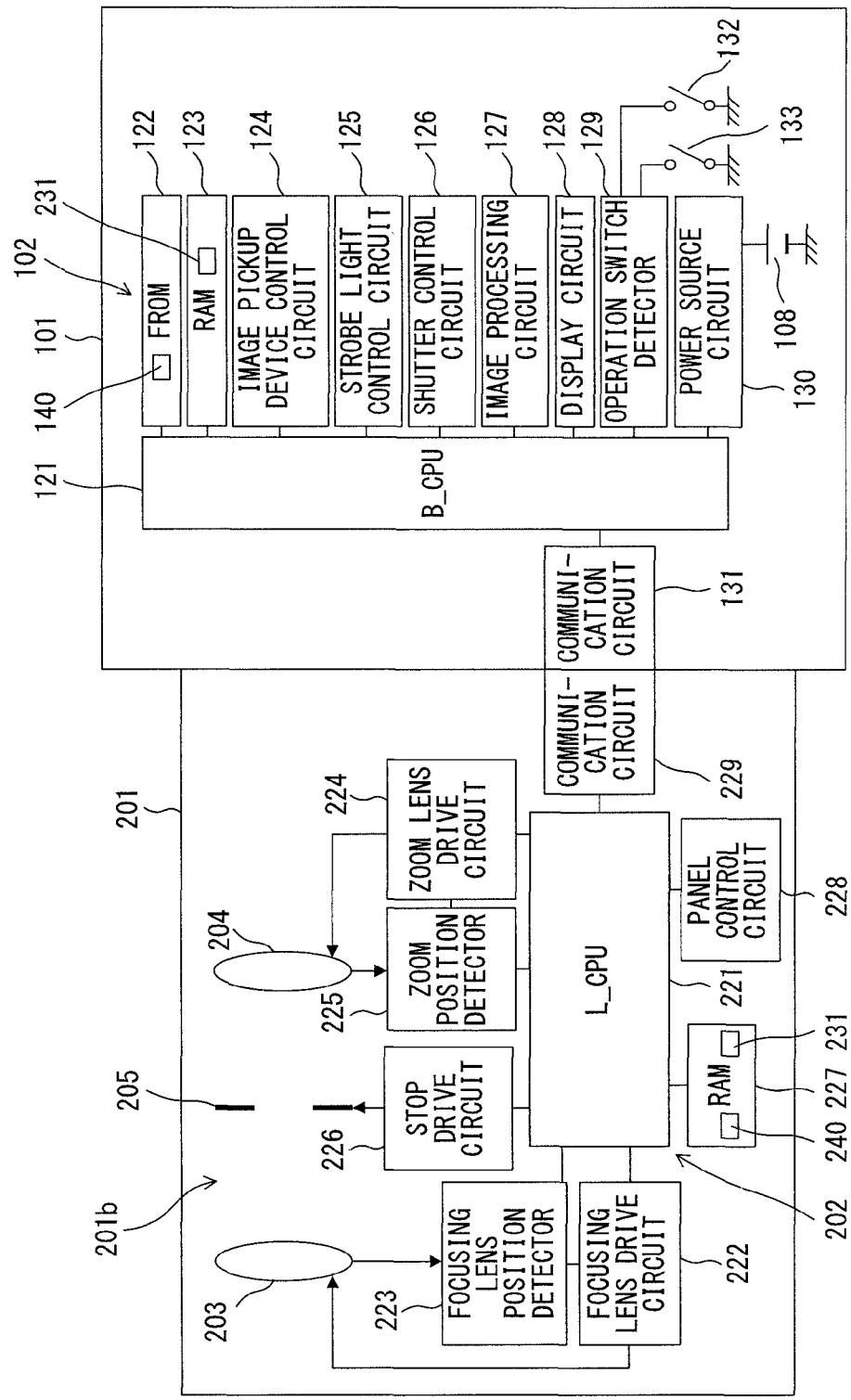
FIG. 3 is a block diagram illustrating an example of the configuration of a control system in a camera system according to the present invention.

Some embodiments of the present invention will be described in detail with reference to the accompanying drawings.

Embodiment 1

FIG. 1 is a schematic diagram of the side view of a camera system in which an interchangeable lens according to embodiment 1 of the present invention is mounted on a camera body. A camera system 100 according to the present embodiment 1 includes a camera body 101 and an interchangeable lens 201 which is mounted on the camera body 101 in an exchangeable manner. A release button 107 is arranged on the top face of the camera body 101. Moreover, the interchangeable lens 201 is provided with a touch panel 206 (touch panel) (contact position detecting unit) on the side of a barrel 201a in which the undermentioned optical system 201b (optical system) is accommodated, and indicators 207 (indicator) that are arranged in accordance with the touch panel 206. The camera body 101, a release button 107, the interchangeable lens 201, a touch panel 206, or the like will be described in detail with reference to the undermentioned FIG. 2. In the present embodiment 1, as will be described later, the indicators 207 are arranged at positions in accordance with an operation mode or a set value displayed on a monitor just below the touch panel 206, such that a photographer using the camera system 100 can recognize the touch position of the touch panel 206 and perform a touch operation by the feel of a thumb without visually checking the display of the touch panel 206. In other words, it is assumed in the present embodiment 1 that when an image is captured, the barrel 201a of the interchangeable lens 201 is supported by a left hand from the bottom and the touch panel 206 is operated by a thumb, and indicators 207 are arranged such that the touch position can be recognized and operated by the feel of a finger without visually checking the touch panel 206 on the side of the barrel 201a of the interchangeable lens 201.

In the present embodiment 1, as an example of capture control information, an example will be explained in which preset focus, preset zoom, or the like are set or operated by operating the touch panel 206 of the interchangeable lens 201. FIG. 2 is an outline of the configuration in which an interchangeable lens according to the present invention is mounted on a camera body. The camera body 101 is configured to include a camera control circuit 102, an image pickup device 103, a focal plane shutter 104, a rear monitor 105 (main body display unit), a strobe light 106, a release button 107, battery 108, or the like. The camera control circuit 102 controls the image pickup device 103 and the focal plane shutter 104 according to the operations of the release button 107 by a photographer, and controls various types of drive of the interchangeable lens 201 via the lens control unit 202. Moreover, the camera control circuit 102 controls the emission of the strobe light 106 as necessary, and controls the display of the rear monitor 105 according to various types of camera operations. The image pickup device 103 is configured by a CCD sensor, a CMOS sensor, or the like, and the image pickup device 103 captures a subject image, which is formed on an image forming plane, by using the optical system 201b of the interchangeable lens 201. The focal plane shutter 104 is opened and closed by an instruction from the camera control circuit 102 according to the operations of the release button 107, thereby exposing the image pickup device 103 to the light. The rear monitor 105 is configured by liquid crystal, organic electroluminescence (OEL), or the like, and the rear monitor 105 displays through images (so called "live view"), which is the real time display of the images output from the image pickup device 103 during standby for capturing images or when shooting videos. Moreover, the rear monitor 105 displays replay images, setting information, or the like according to the operations of a replay button (not illustrated) or various types of setting means by a photographer.

The strobe light 106 flashes light according to an instruction from the camera control circuit 102 in synchronization with the exposure operation of the focal plane shutter 104. The release button 107 is operated by a photographer, thereby instructing the camera system 100 in which the interchangeable lens 201 is mounted on the camera body 101 to execute capturing operations such as autoexposure (AE), autofocus (AF), and exposure. The battery 108 supply electricity to the camera body 101 and the interchangeable lens 201. Moreover, the interchangeable lens 201 is configured to include the optical system 201b comprised of a focusing lens 203 arranged in an axial direction inside the barrel 201a, the zoom lens 204, a stop 205, or the like, the lens control unit 202 that controls the optical system 201b, the touch panel 206, or the like. The lens control unit 202 controls the drive or the like of the focusing lens 203, the zoom lens 204, and the stop 205 according to an instruction from the camera control circuit 102 or an operation of the touch panel 206 by a photographer. The focusing lens 203 moves in an optical axis direction according to an instruction from the lens control unit 202, and thereby adjusts the focusing state of the interchangeable lens 201. The zoom lens 204 moves in an optical axis direction according to an instruction from the lens control unit 202, and thereby changing the focal length of the interchangeable lens 201. At the stop 205, the aperture area is changed according to an instruction from the lens control unit 202, thereby adjusting the amount of light of a subject light 700 incident from an outer edge of the barrel 201a. The touch panel 206 is arranged on a monitor, which is provided on a side of the barrel 201a of the interchangeable lens 201 to display an operation mode, a set value, or the like, and the touch panel 206 includes a detection plane for detecting various types of input operations by a photographer. Hereinafter, in the present embodiment, a monitor and a touch panel are combined as a member provided with both functions, and is referred to as the touch panel 206.

Next, an example of the configuration of a control system in the camera system 100 according to the present embodiment 1 will be explained with reference to the block diagram of FIG. 3. FIG. 3 is a block diagram illustrating an example of the configuration of a control system in a camera system according to the present invention. Firstly, the control system of the camera body 101 is, by way of example, as follows. The camera body CPU 121 (main body controller) (B CPU) is connected to a nonvolatile memory 122 (main body storage unit) (FROM), a memory 123, an image pickup device control circuit 124, an image processing circuit 127, a shutter control circuit 126, a display circuit 128, a strobe light control circuit 125, an operation switch detector 129, a power source circuit 130, a camera body communication circuit 131 (main body communication unit), or the like, and the camera body CPU 121 controls the entirety of the camera system 100. The nonvolatile memory 122 is configured by a rewritable and nonvolatile semiconductor memory or the like, and a program 140 or the like of the camera body CPU 121 is stored in the nonvolatile memory 122. As the camera body CPU 121 executes the program 140, control operations of the operations exemplified in the undermentioned flowcharts on the camera body 101 side are realized. The memory 123 is configured by a semiconductor memory such as a RAM, and the memory 123 temporarily stores a program or various types of information which are used by the camera body CPU 121. The image pickup device control circuit 124 controls the image pickup device 103, and when operations that require image data such as the display of through images, AE, AF, exposure are executed, the image pickup device control circuit 124 controls the image pickup device 103 to perform capture operations for converting a subject image into an image signal. The strobe light control circuit 125 controls the light emission of the strobe light 106. The shutter control circuit 126 controls the opening and closing operations of the focal plane shutter 104.

The image processing circuit 127 creates image data by performing image processing such as A/D conversion and filter processing on an image signal output from the image pickup device 103 and storing the processed image signal as a captured image. Moreover, the image processing circuit 127 extracts a high-frequency component from the image data within a focus detection area, and calculates an AF evaluation value. The display circuit 128 displays a captured image, various types of capture information, or the like on the rear monitor 105. The operation switch detector 129 is connected to various types of operation switches such as a selector switch (not depicted) for switching capture modes of the camera of the camera body 101 operated by a photographer, a first release switch 132 which is operated by an operation of the release button 107, and a second release switch 133, and states of these operation switches are detected by the operation switch detector 129. The power source circuit 130 performs smoothing, boosting, or the like of the voltage of the battery 108, and supplies power to the camera. The camera body communication circuit 131 communicates with the lens CPU 221 (lens controller) through the lens communication circuit 229 (lens communication unit). The first release switch 132 turns to an ON-state when the release button 107, which is a general two-stage switch, is pressed halfway down, and once an ON-state is detected by the operation switch detector 129, the camera body CPU 121 executes AE, AF, or the like (hereinafter, referred to as 1R switch).

The second release switch 133 turns to an ON-state the release button 107, which is a two-stage switch, is pressed all the way down, and once an ON-state is detected by the operation switch detector 129, the camera body CPU 121 performs an exposure operation (hereinafter, referred to as 2R switch). On the other hand, the control system of the interchangeable lens 201 is as follows. The lens CPU 221 (L_CPU) is connected to a focusing lens drive circuit 222, a focusing lens position detector 223, a zoom lens drive circuit 224, a zoom position detector 225, a stop drive circuit 226, a memory 227 (lens storage unit), a panel control circuit 228, a lens communication circuit 229, or the like. Moreover, the lens CPU 221 performs various types of drive control on, for example, a lens drive and a stop drive, and communicates with the camera body CPU 121 through the lens communication circuit 229 and the camera body communication circuit 131. By so doing, an operation instruction is received, and an operation state, optical data, or the like of the interchangeable lens 201 is transmitted.

The focusing lens drive circuit 222 is configured to include an actuator such as a stepping motor, a motor driver, or the like, and the focusing lens drive circuit 222 controls the drive of the focusing lens 203. The focusing lens position detector 223 is configured to include a photo interrupter (PI) circuit or the like which converts a rotation amount of the driving motor included in the focusing lens drive circuit 222 into a pulse number, and the focusing lens position detector 223 detects the position of the focusing lens 203. The zoom lens drive circuit 224 is configured to include an actuator such as a stepping motor, a motor driver, or the like, and the zoom lens drive circuit 224 controls the drive of the zoom lens 204. The zoom position detector 225 is configured to include an encoder, and the zoom position detector 225 detects the position of the zoom lens 204 according to an output of the encoder. The stop drive circuit 226 is configured to include an actuator such as a stepping motor, a motor driver, or the like, and the stop drive circuit 226 controls the opening operation of the stop 205. The memory 227 is configured by semiconductor memory such as RAM, and the memory 227 temporarily stores the program 240 of the lens CPU 221 and various types of information. The program 240 is stored in a nonvolatile memory (not depicted) within the interchangeable lens 201, and is executed by the lens CPU 221. By so doing, the operations on the interchangeable lens 201 side are realized as exemplified in the undermentioned flowcharts. The panel control circuit 228 detects how a finger contacts the touch panel 206 (contact state), and displays information such as an operation mode or an operational setting value on a display monitor provided on the back of the touch panel 206. The lens communication circuit 229 is connected to the camera body communication circuit 131 of the camera body 101 through a communication connecting terminal provided outside the interchangeable lens 201, thereby receiving a drive instruction or the like of the focusing lens 203 or the stop 205 from the camera body CPU 121, and transmitting optical data, lens position information, operating state, or the like to the camera body CPU 121.

Next, the touch panel 206 according to the present embodiment 1 will be explained further in detail.

FIG. 4 illustrates an example of the touch panel display of the interchangeable lens according to embodiment 1 of the present invention. In the present embodiment 1, an operation mode display area 206a (second area) and a set value display area 206b (first area) are provided on the touch panel 206. The operation mode display area 206a is used as a fixed preset operation mode display area 206ap, and the set value display area 206b is used as a corresponding fixed preset value display area 206bp. In other words, a touch panel display 4a depicts an example of a preset operation mode display area 206ap and a preset value display area 206bp when a preset focusing mode is used to drive the focusing lens 203 to a position with preset distance at which focus of a subject is achieved. A touch panel display 4b depicts an example of a preset operation mode display area 206ap and a preset value display area 206bp when a preset zoom mode is used to drive the zoom lens 204 to a position at which the focal length has a preset value. A touch panel display 4c depicts an example of a preset operation mode display area 206ap and a preset value display area 206bp when a preset stop mode is used to drive the stop 205 such that the stop aperture will have a preset f-stop number. FIG. 5 depicts an example of the selection state indication of preset values on the touch panel of the interchangeable lens according to embodiment 1 of the present invention. A touch panel display 5a depicts an example in which selection state indication of a preset value is indicated on the preset value display area 206bp with reverse video 217. A touch panel display 5b depicts an example in which selection state indication of a preset value is indicated on the preset value display area 206bp with a selection frame 216. A touch panel display 5c depicts an example in which selection state indication of a preset value indicated on the preset value display area 206bp with blinking indication 218.

Figure 6:
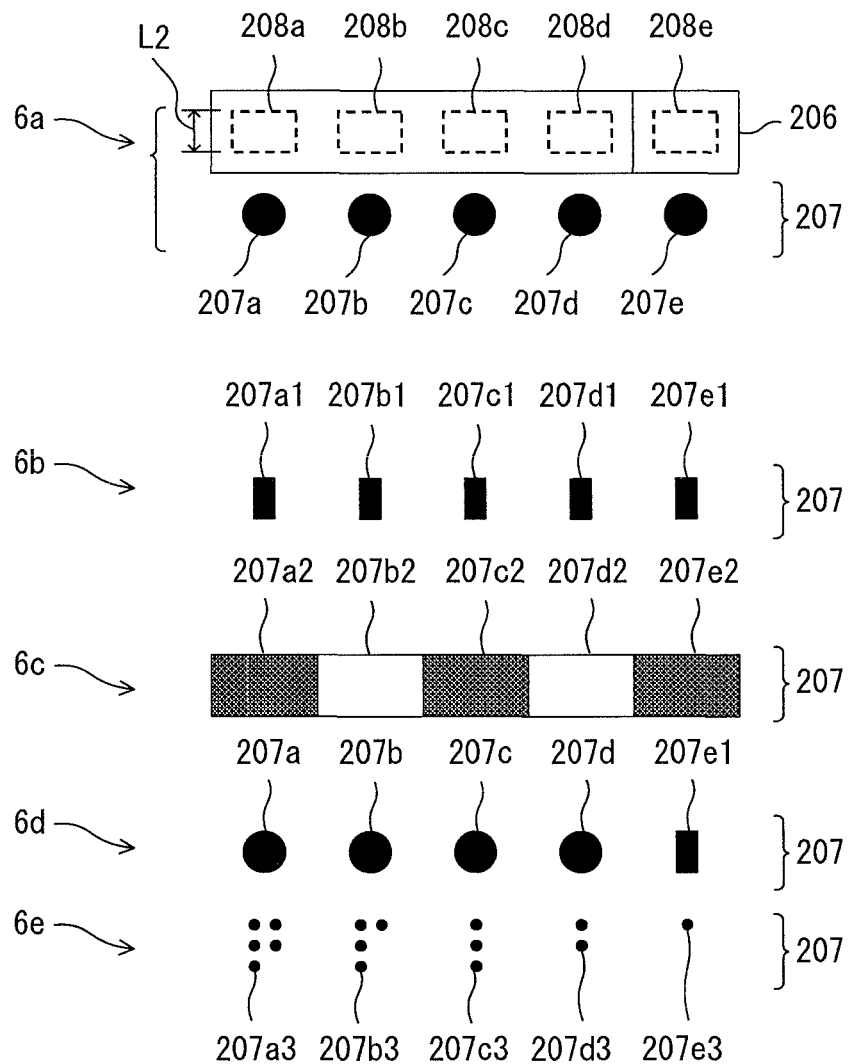
FIG. 6 illustrates an example of the positional relationship between touch position detection areas of a touch panel of an interchangeable lens according to embodiment 1 of the present invention and positions at which indicators are arranged, and indicator types.

FIG. 6 illustrates an example of the positional relationship between touch position detection areas of the touch panel of the interchangeable lens according to embodiment 1 of the present invention and positions at which indicators are arranged, and indicator types. In this FIG. 6, touch position detection areas for setting and operation 208a-208d correspond to the display positions of the set value display area 206b of the touch panel 206. Touch position detection area for operation mode selection 208e corresponds to operation mode display position of the operation mode display area 206a of the touch panel 206. A positional relationship 6a depicts an example of the positional relationship between the touch position detection areas of the touch panel 206 (in this case, touch position detection areas for setting and operation 208a—touch position detection areas for setting and operation 208d, and touch position detection area for operation mode selection 208e) and the positions at which indicators 207 of hemisphere-protrusion type are arranged. The positions of the hemisphere-protrusion-shaped indicators 207a-207d correspond to the touch position detection areas for setting and operation 208a-208d within the set value display area. The positions of the hemisphere-protrusion-shaped indicator 207e correspond to the touch position detection area for operation mode selection 208e. The indicators 207 may be in various kinds of different shapes apart from a hemisphere-protrusion shape. For example, an indicator 6b depicts an example of the indicators of rectangular protrusion type. In this case, the indicators 207 are comprised of rectangular-protrusion-shaped indicators 207a1-207d1 which correspond to the touch position detection areas for setting and operation 208a-208d within the set value display area. Moreover, the position of the rectangular-protrusion-shaped indicator 207e1 corresponds to the touch position detection area for operation mode selection 208e.

An indicator 6c depicts an example of the indicators where concave and convex surfaces and gloss surfaces are arranged in an alternate manner. A concave and convex surface 207a2, a gloss surface 207b2, a concave and convex surface 207c2, and a gloss surface 207d2 correspond to the touch position detection areas for setting and operation 208a-208d within the set value display area, respectively. A concave and convex surface 207e2 corresponds to the touch position detection area for operation mode selection 208e. An indicator 6d depicts an example of the indicators where indicators of hemisphere-protrusion type are used for the positions corresponding to the set value display area of the touch panel 206 and an indicator of rectangular protrusion type is used for the position corresponding to the operation mode display area. In other words, indicator 6d depicts an example where a hemisphere-protrusion-shaped indicators 207e is replaced with a rectangular-protrusion-shaped indicator 207e1 in the indicators 207 exemplified in the positional relationship 6a. An indicator 6e depicts an example of the indicators of braille type. In other words, braille 207a3, braille 207b3, braille 207c3, and braille 207d3 correspond to the touch position detection areas for setting and operation 208a-208d within the set value display area, respectively, and braille 207e3 corresponds to the touch position detection area for operation mode selection 208e.

Figure 7A:
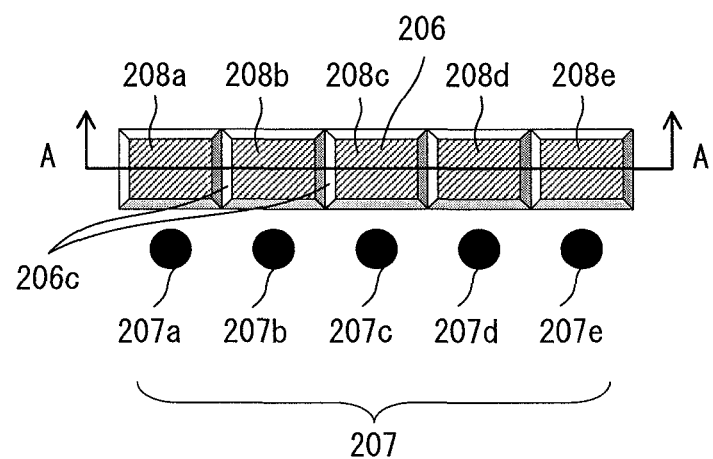
FIG. 7A is a front view illustrating a modification of a touch panel of an interchangeable lens according to embodiment 1 of the present invention.
Figure 7B:
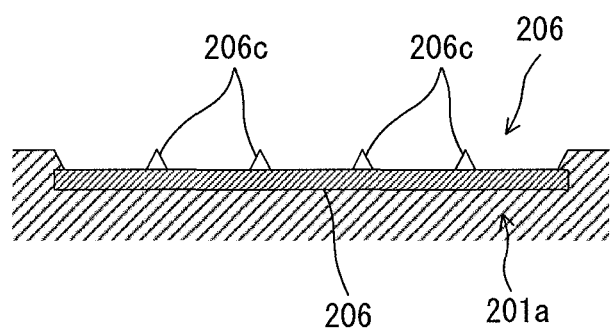
FIG. 7B is a section view of line A-A in FIG. 7A.
Figure 8:
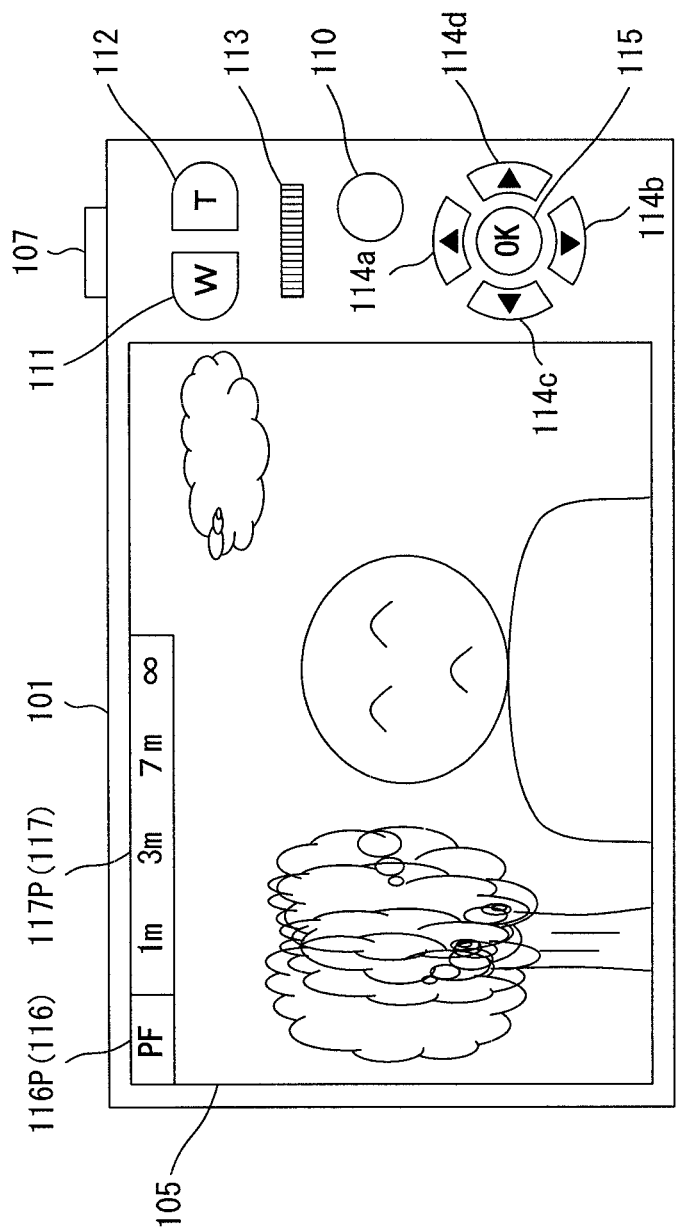
FIG. 8 illustrates an example of the preset setup display on a rear monitor of the camera body according to embodiment 1 of the present invention.

FIG. 7A is a front view illustrating a modification of the touch panel of the interchangeable lens according to embodiment 1 of the present invention, and FIG. 7B is a section view of line A-A. FIG. 7A and FIG. 7B illustrate an example in which dividers 206c are formed at boundaries between the touch position detection areas for setting and operation 208a—touch position detection areas for setting and operation 208d and the touch position detection area for operation mode selection 208e. FIG. 8 illustrates an example of the preset setup display on a rear monitor of the camera body according to embodiment 1 of the present invention. On the rear side of the camera body 101, a rear monitor 105, a wide-angle zoom button 111, a telescopic zoom button 112, a selection dial 113, a video button 110, an up button 114a, a down button 114b, a left button 114c, a right button 114d, and a decision button 115 are arranged. The video button 110 is operated for starting and ending video recording. If a motorized zoom lens is mounted on the camera body 101, the wide-angle zoom button 111 is operated for zooming out to a wide-angle side, and the telescopic zoom button 112 is operated for zooming in to a telescopic side. The selection dial 113 is used for selecting the shooting parameter such as a shutter speed or a f-stop number, an AF area, or the like. The up button 114a, down button 114b, left button 114c, right button 114d are used for selecting the shooting parameter such as a shutter speed or a f-stop number, an AF area, or the like. The decision button 115 is used for deciding the shooting parameter or the like selected by the selection dial 113 or the up button 114a-right button 114d. On the top-left of the rear monitor 105, an operation mode indicator 116 and a set value indicator 117 are arranged. The operation mode indicator 116 indicates the operation executed by manipulating the touch panel 206 of the interchangeable lens. The set value indicator 117 indicates the setting selectable by manipulating the touch panel 206 of the interchangeable lens. In the example of FIG. 8, a preset operation mode indicator 116p is provided for the operation mode indicator 116, and a preset value indicator 117p is provided for the set value indicator 117.

Figure 9:
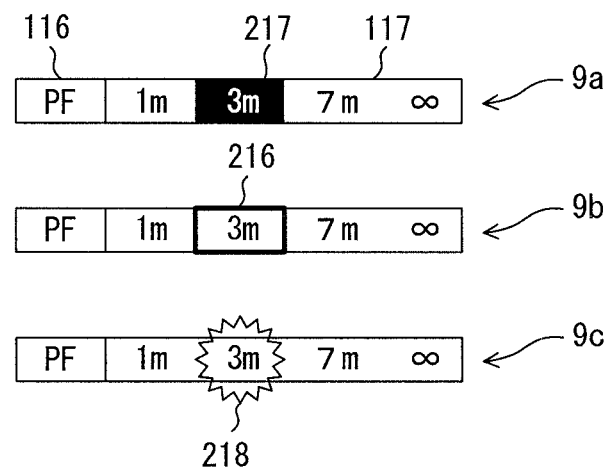
FIG. 9 illustrates an example of the selection state indication of preset values on a rear monitor of a camera body according to embodiment 1 of the present invention.

FIG. 9 illustrates an example of the selection state indication of preset values on a rear monitor of the camera body according to embodiment 1 of the present invention. A selection state indication 9a is an example in which selection state indication of a preset value is indicated on the rear monitor 105 of the camera body 101 with the reverse video 217. A selection state indication 9b is an example in which selection state indication of a preset value is indicated on the rear monitor 105 of the camera body 101 with the selection frame 216. A selection state indication 9c is an example in which selection state indication of a preset value is indicated on the rear monitor 105 of the camera body 101 with the blinking indication 218.

Examples of displays and operations are described below. When the operations on the touch panel 206 are effective as illustrated in FIG. 4, a selected preset operation mode is displayed on the operation mode display area 206a of the touch panel 206, and a selectable preset value according to the selected mode is displayed on the set value display area 206b, at positions corresponding to the touch position detection areas 208a-208e. Also on the rear monitor 105 of the camera body 101 and in an electronic viewfinder (hereinafter, referred to as EVF), the preset operation mode indicator 116p and the preset value indicator 117p are displayed in a similar manner to the display on the touch panel 206 as illustrated in FIG. 8. Accordingly, a photographer may perform preset operations according to operation modes such as preset focus by touching the preset values displayed on the set value display area 206b of the touch panel 206. Once a touch operation is performed by a photographer, the touched portions of the touch panel 206 are displayed with the reverse video, the selection frame, the blinking indication, or the like as illustrated in the touch panel displays 5a-5c of FIG. 5, and the rear monitor 105 of the camera body 101 or the EVF (not illustrated) are also displayed with the reverse video, the selection frame, the blinking indication, or the like in a similar manner to the display of the touch panel 206 as illustrated in the selection state indications 9a-9c of FIG. 9, indicating that the touch operation is accepted.

Figure 10:
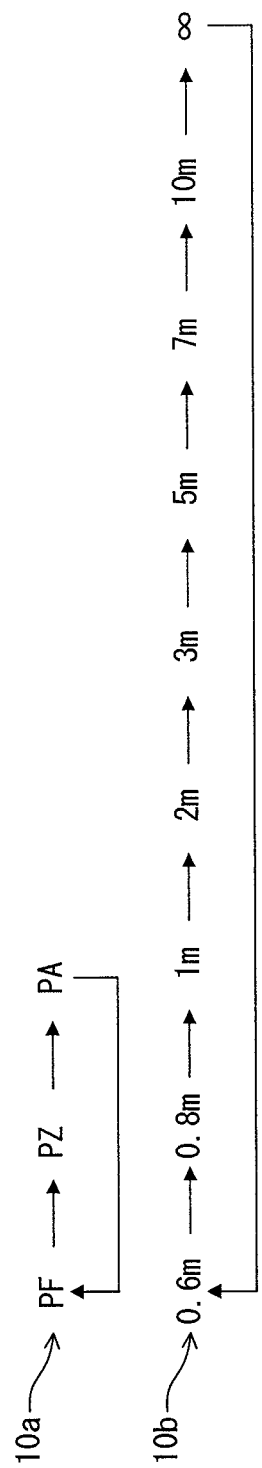
FIG. 10 illustrates an example of the changing order of display when preset operation modes and preset values are changed by operating the touch panel of an interchangeable lens according to embodiment 1 of the present invention.

FIG. 10 illustrates an example of the changing order of display when preset operation modes and preset values are changed by operating the touch panel of the interchangeable lens according to embodiment 1 of the present invention. A changing order of display 10a is an example of the changing order of display of the preset operation modes. A changing order of display 10b is an example of the changing order of display of the preset values. The preset operation mode may be changed by touching a portion of the preset operation mode display area 206ap of the touch panel 206 with a finger of a photographer. Every time a touch operation is performed on the display, the display of the preset operation mode on the touch panel 206 and the rear monitor 105 of the camera body 101, and the EVF (not illustrated) are switched as illustrated in the changing order of display 10a of FIG. 10, and thereby the operation mode is changed. If a portion of the preset value display area 206bp is pressed and held by a finger, a shift is made to a preset value changing mode, and the portion which is pressed and held turns to the blinking indication 218 or the like. If a finger is released in this state and a touch operation is performed, every time an operation is made, the preset value indicator of the relevant portion of the touch panel 206 and the rear monitor 105 of the camera body 101, and the EVF (not illustrated) is switched as illustrated in the changing order of display 10b, and thereby the preset value is changed. If the preset value display area 206bp is pressed and held again, the selected preset value becomes definitive, and the display returns to a normal state. The preset value may be changed in a different method other than the method described above. For example, when the focal length of 60 mm is set as the preset value in the preset zoom mode, the preset value may be changed by pressing a portion of the touch panel 206 (preset value display area 206bp) at which the preset value to be changed for a long time, where the zoom position is manually being set to the position of 60 mm.

Figure 11B:
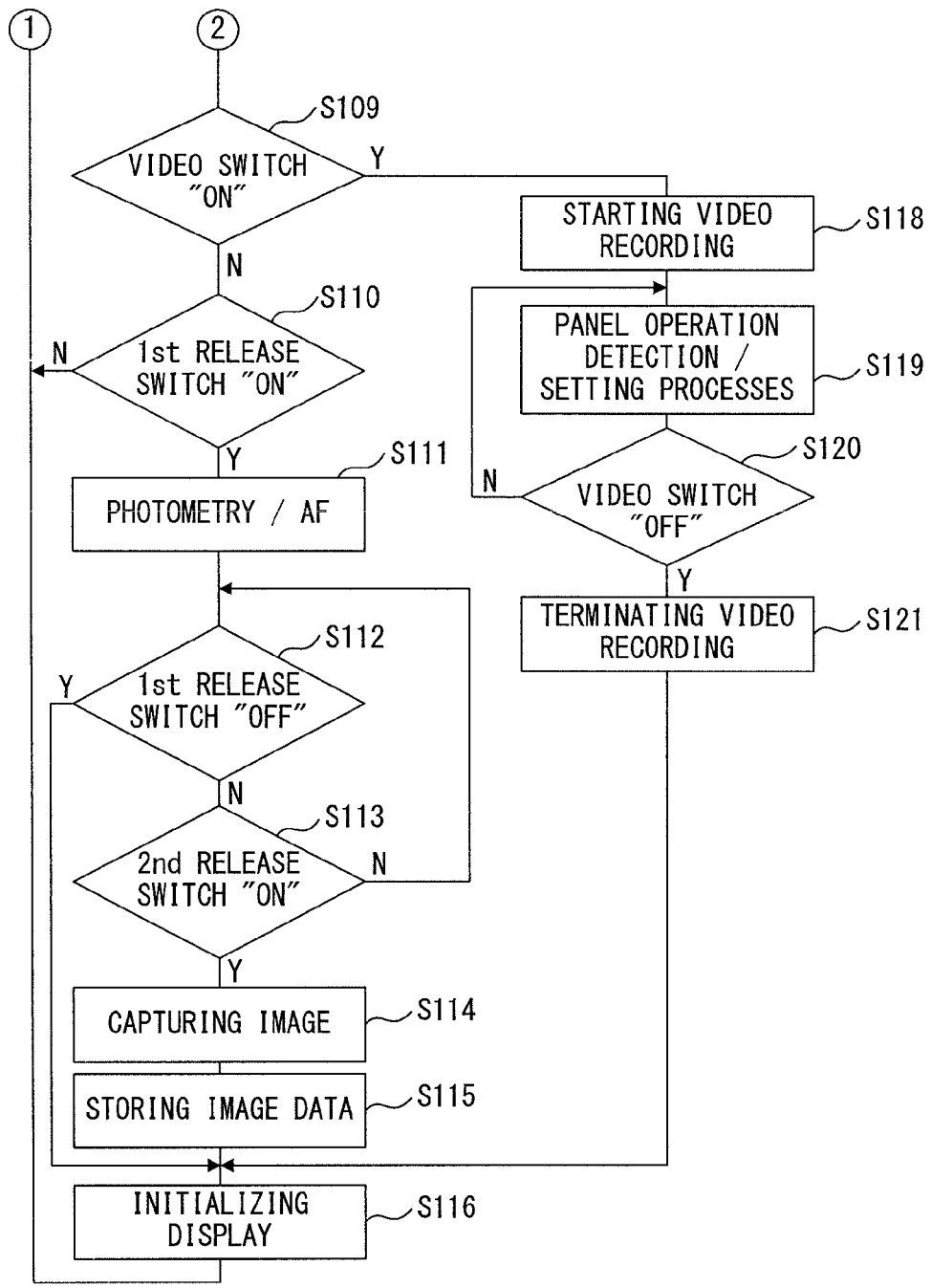

Examples of the operations of the touch panel 206 of the interchangeable lens 201 in the camera system 100 according to the present embodiment will be explained with reference to the flowcharts or the like of FIGS. 11A, 11B and FIGS. 12A, 12B, 12C. FIGS. 11A, 11B are a flowchart explaining an example of the capturing operations of a camera equipped with the interchangeable lens according to the present invention. In step S101, when the power source of the camera body 101 is turned ON, the camera body CPU 121 determines whether or not the interchangeable lens 201 is mounted by detecting a mount-switch state (not illustrated) at the operation switch detector 129. When it is determined that the interchangeable lens 201 is not mounted, standby operations are performed, for example, by repeating mounting detection on a regular basis until the interchangeable lens 201 is mounted. If a photographer changes a shooting parameter or replays the images captured in the past during standby, the instructed operations are performed. In step S102, once the interchangeable lens 201 is mounted on the camera body 101, the lens CPU 221 initializes the interchangeable lens 201, and disables the operation acceptance of the touch panel 206. The setting of disabling the operations of the touch panel 206 may be instructed by the camera body 101 at the time of the communication with the lens in step S103.

In step S103, once it is confirmed that the interchangeable lens 201 has been mounted, the camera body CPU 121 communicates with the lens CPU 221 through the camera body communication circuit 131 and the lens communication circuit 229 to obtains an operational parameter of the focusing lens 203 or the like, optical data such as chromatic aberration data, and lens data such as preset-operation-ready data (capture control information), and stores the obtained data in the memory 123. Here, preset-operation-ready data is configured by the data such as preset operable modes of the focus preset operation or the like, initial preset values of each preset operable mode, and a preset value settable range or a resolution power, and the camera body CPU 121 performs preset setup display on the rear monitor 105 or the EVF (not illustrated), as illustrated in FIG. 4 or FIG. 5 above, according to these pieces of data when in a preset mode. Alternatively, at this stage, the camera body 101 may determine selectable preset operation modes, an initial preset value of each mode, selectable preset values, or the like according to the preset-operation-ready data, and the camera body CPU 121 may instruct the lens CPU 221 through the camera body communication circuit 131 and the lens communication circuit 229.

In step S104, after performing acquisition of lens data, initial setting, or the like as in step S102, the camera body CPU 121 starts synchronous communication with the lens CPU 221 through the camera body communication circuit 131 and the lens communication circuit 229, and shifts to a synchronous communication mode. After that, the camera body CPU 121 obtains lens state data 231 (capture control information) in every synchronization cycle, and performs control operation according to the state of the lens. For example, the camera body CPU 121 detects an operative condition of the touch panel 206 of the interchangeable lens 201 from the lens state data 231 obtained in the synchronous communication when in the preset mode, and performs preset setup display on the rear monitor 105 or the EVF (not illustrated) according to the detected operative condition.

In step S105, the camera body CPU 121 instructs the image pickup device control circuit 124 to operate the image pickup device 103 in every synchronization cycle, and thereby obtains image data. Then, the camera body CPU 121 instructs the image processing circuit 127 to perform image processing on the obtained image data for through image display, and instructs the display circuit 128 to start displaying through images on the rear monitor 105. In step S106, the camera body CPU 121 detects whether or not the interchangeable lens 201 is mounted by checking the lens state data 231 obtained in the synchronous communication and by a mount-switch state (not illustrated) detected by the operation switch detector 129. When it is detected that the interchangeable lens 201 is mounted, the operation proceeds to step S107, and when the interchangeable lens 201 is removed, the operation returns to step S101.

In step S107, whether or not the power source of the camera body 101 is turned ON is checked, and when the power source is turned ON, the operation proceeds to step S108. When the power source is turned OFF, the operation proceeds to step S117. In step S108, the lens CPU 221 executes operation processes or operation setting processes according to the enabled/disabled state of the touch panel 206 and the detection result of the touch operations made by a photographer.

The camera body CPU 121 detects the states of touch operation from the lens state data 231 obtained in the synchronous communication, and instructs the rear monitor 105 or the EVF (not illustrated) to display the operative condition or the like according to the detection result. The operation processes or operation setting processes will be explained in detail with reference to FIGS. 12A, 12B, 12C below.

In step S109, the video button 110 is operated, and when the operation switch detector 129 detects that a video switch (not illustrated) turns to an ON-state, the operation proceeds to step S118. When the operation switch detector 129 detects that the video switch turns to an OFF-state, the operation proceeds to step S110. In step S110, when the operation switch detector 129 detects that the 1R switch 132 is turned to an ON-state, the operation proceeds to step S111. When it is detected that the 1R switch 132 is turned to OFF-state, the operation returns to step S106.

In step S111, the camera body CPU 121 communicates with lens CPU 221, and performs AF for capturing a static image. The AF for capturing a static image performs a so-called hill-climbing AF operation where a position at which a high-frequency component extracted from the captured image (hereinafter, referred to as AF evaluation value) becomes the largest is taken as a focus position, or a phase difference AF operation where the control the drive of the focusing lens 203, according to a defocused amount obtained from a phase shift in two or more pairs of output of pixels for AF.

That is, these pixels for the phase difference AF are arranged on the image pickup device 103, and each pixel receives a subject light flux that has passed through different pupil positions of the interchangeable lens 201. In parallel with the AF operation, other operations required for capturing an image such as photometry and exposure calculations are also executed. In step S112, the operation switch detector 129 checks whether or not the 1R switch 132 is in an ON-state, and when in an ON-state, the operation proceeds to step S113. When in an ON-state, the operation proceeds to step S116. In step S113, when the operation switch detector 129 detects that the 2R switch 133 is turned to an ON-state, the operation proceeds to step S114. When it is detected that the 2R switch 133 is turned to an OFF-state, the operation returns to step S112. In step S114, the camera body CPU 121 communicates with the lens CPU 221 according to a result of the exposure calculation in step S111, and instructs the stop 205 to adjust itself. After the adjustment operation is complete, the camera body CPU 121 instructs the image pickup device control circuit 124 and the shutter control circuit 126 to control the image pickup device 103 and the focal plane shutter 104, thereby capturing an image. Then, the camera body CPU 121 instructs the image processing circuit 127 to convert a signal of the captured image output from the image pickup device 103 into image data.

In step S115, the camera body CPU 121 stores the image data obtained in step S114 in the memory 123 or external media such as compactflash, and instructs the display circuit 128 to display the captured image on the rear monitor 105. In step S116, the camera body CPU 121 instructs the display circuit 128 to execute initialization of the focus indication, clearance of the display of the captured image, or the like, and thereby returns the display of the rear monitor 105 to the through image display. After that, the operation returns to step S106, shifting to a standby state for capturing an image. In step S117, specified operations such as a saving operation of various types of data, a resetting operation, and an operation of terminating the power source system are executed. In step S118, the camera body CPU 121 instructs the image pickup device control circuit 124 to operate the image pickup device 103 in every synchronization cycle, and thereby initiating video recording. At the same time, the camera body CPU 121 starts storing the video data obtained by converting the capture signal output from the image pickup device 103 at the image processing circuit 127 in the memory 123 or external media such as compact flash.

In step S119, the lens CPU 221 and the camera body CPU 121 execute the display of operation processes or operation setting processes, operative conditions, or the like, in a similar manner to step S108, according to the enabled/disabled state of the touch panel 206 and the detection result of the touch operations made by a photographer. The operation processes and operation setting processes will be explained in detail with reference to FIGS. 12A, 12B, 12C below. In step S120, when the operation switch detector 129 detects that the video button 110 is operated and the video switch (not illustrated) is turned to an OFF-state, the operation proceeds to step S121. When the video switch is turned to an ON-state, the operation returns to step S119. In step S121, the camera body CPU 121 instructs the image pickup device control circuit 124 to terminate the operation of the image pickup device 103 and ends the video recording, and then the operation shifts to step S116.

Figure 12A:
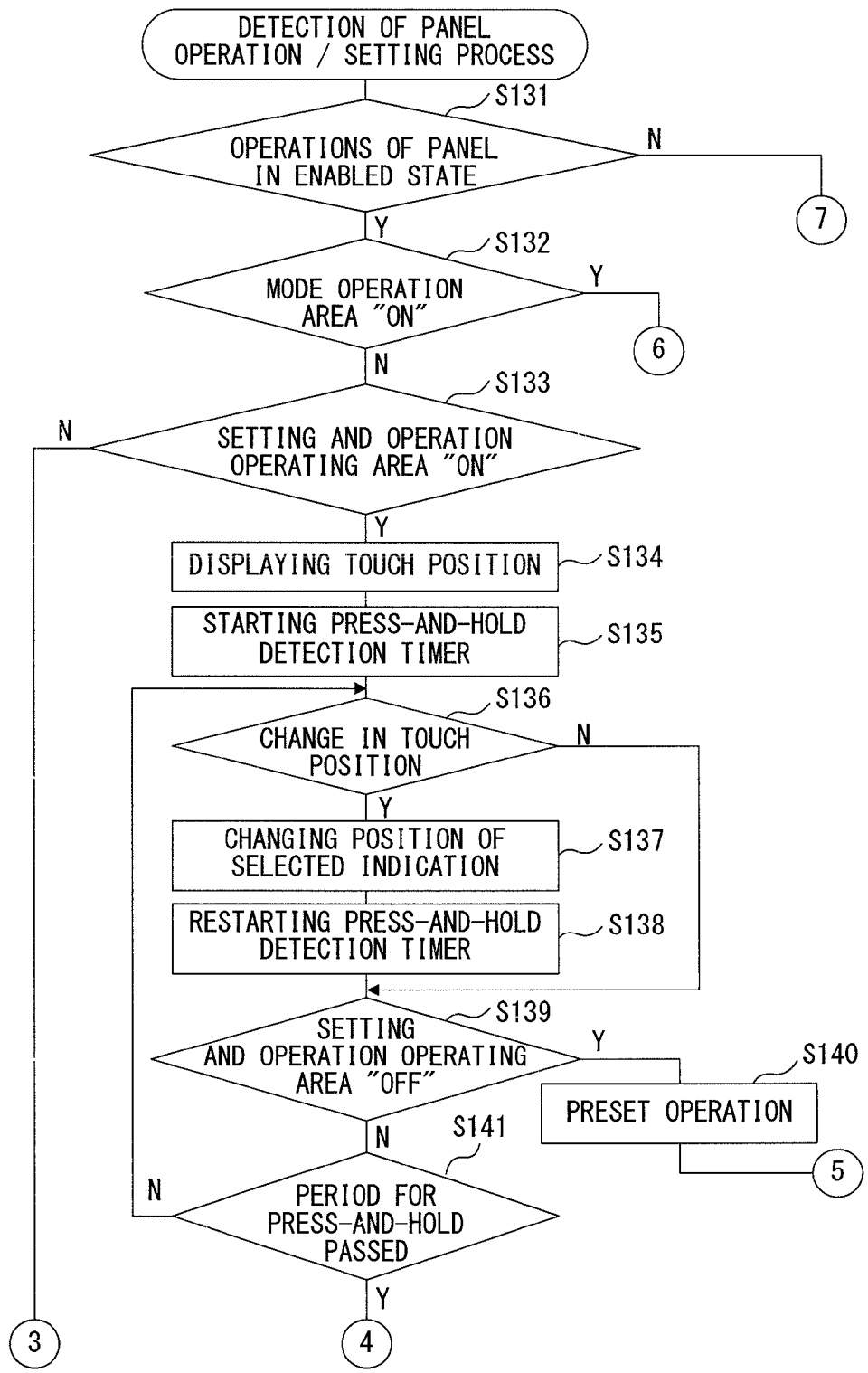
FIGS. 12A, 12B, 12C are a flowchart explaining an example of the processes related to preset operations of an interchangeable lens according to embodiment 1 of the present invention.
Figure 12B:
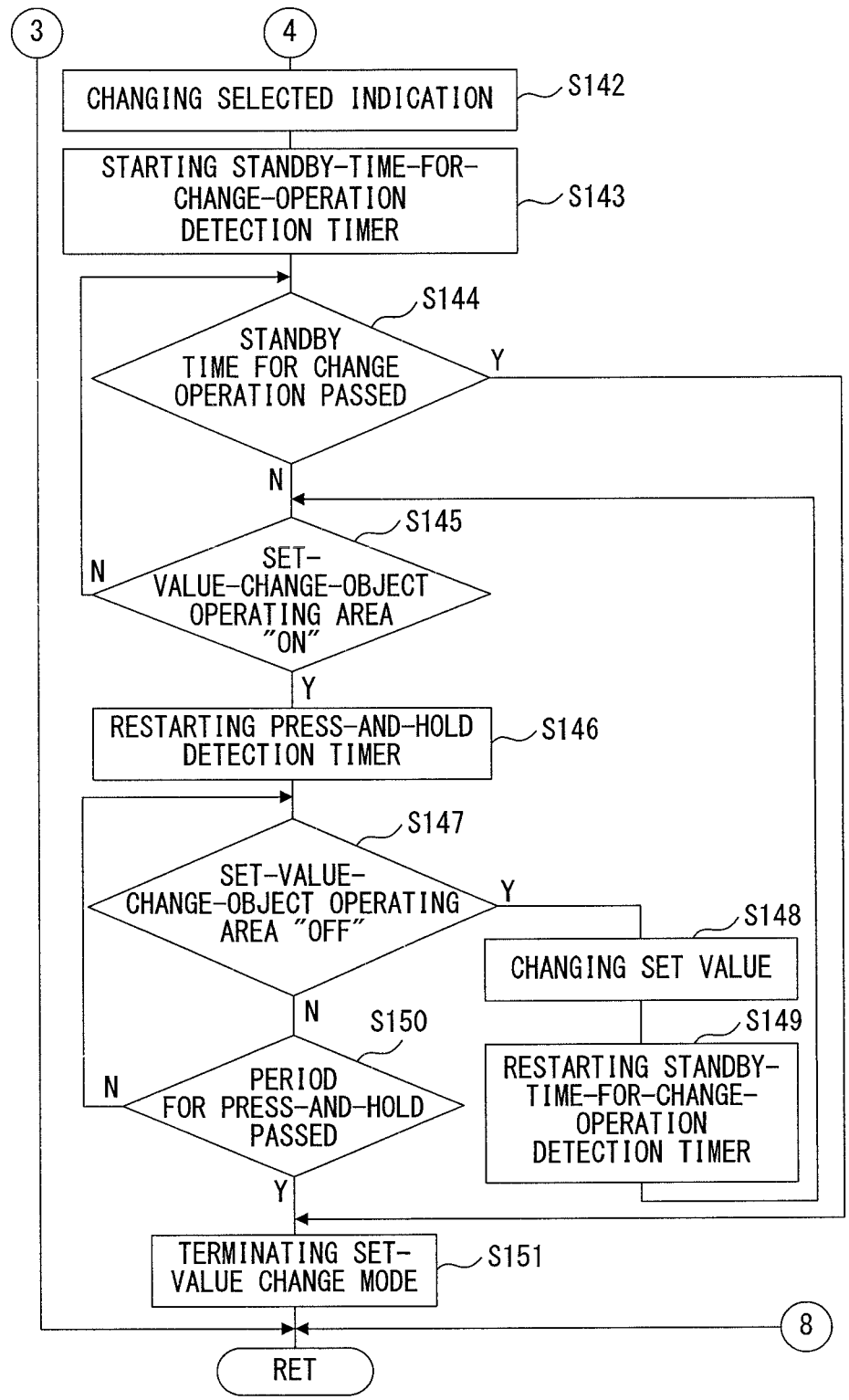
Figure 12C:
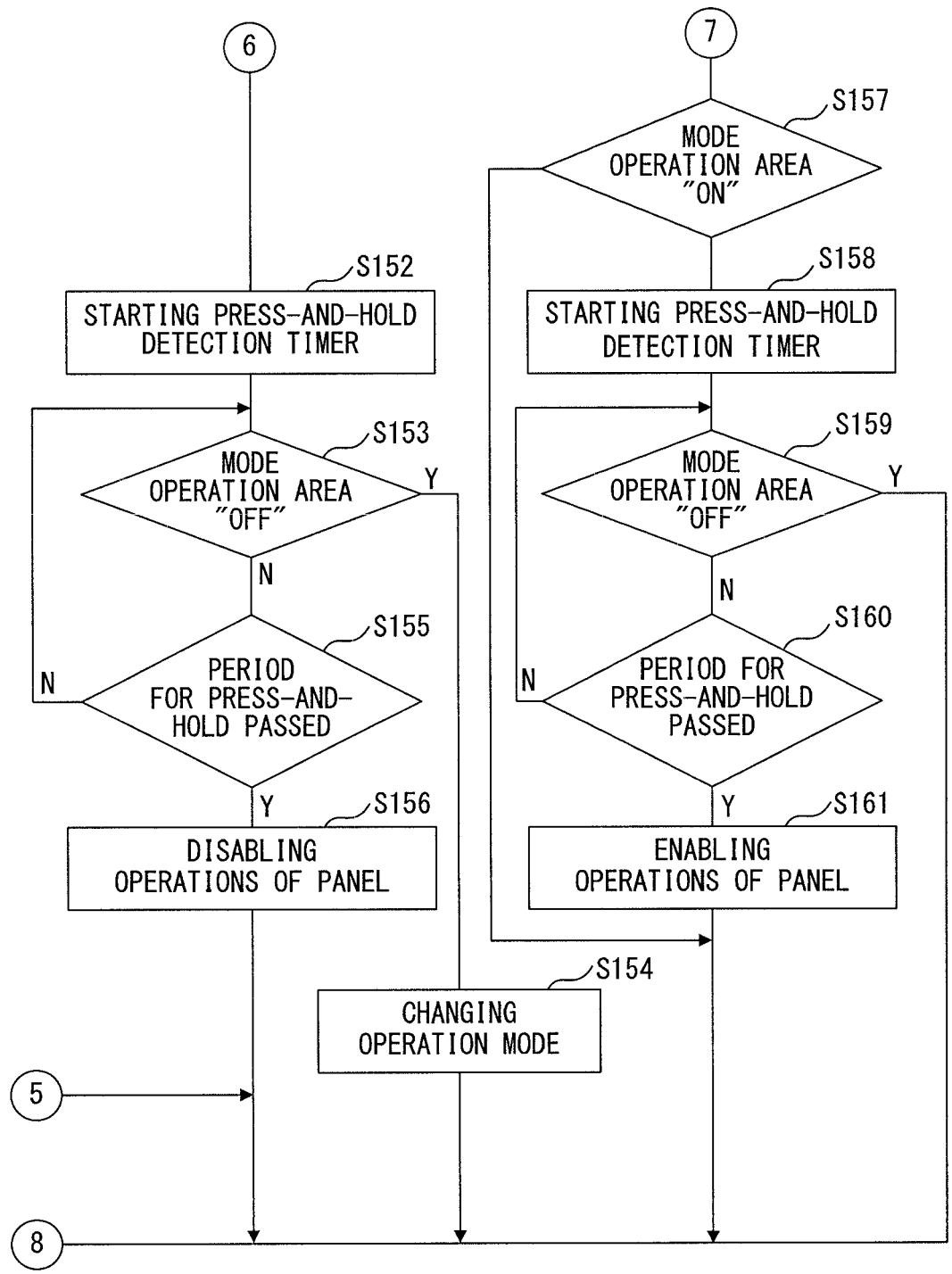

FIGS. 12A, 12B, 12C are a flowchart explaining an example of the processes related to preset operations of the interchangeable lens according to embodiment 1 of the present invention. In step S131, whether or not the operation acceptance state of the touch panel 206 on the interchangeable lens 201 is effective is determined, and when it is determined to be effective, the operation proceeds to step S132. When it is determined to be ineffective, the operation proceeds to step S157. In step S132, the lens CPU 221 determines whether the panel control circuit 228 has detected that a finger touched the touch position detection area for operation mode selection 208e, and when it has not been detected, the operation proceeds to step S133. When it has been detected, the operation proceeds to step S152. The finger contact on the touch panel 206 and contact areas are detected by the panel control circuit 228 at specified time intervals, for example, at intervals of 10 milliseconds (ms), thereby updating the state of a contact detection register or the like within the panel control circuit 228. In step S133, the lens CPU 221 determines whether the panel control circuit 228 has detected that a finger contacted the touch position detection areas for setting and operation 208a-208d, and when it has been detected, the operation proceeds to step S134. When it has not been detected, the operation returns. The contact state is detected in a similar manner to step S132. In step S134, the lens CPU 221 changes the preset value indicators of the touch panel 206 to the selected indication at positions that correspond to the areas within the touch position detection areas for setting and operation 208a-208d at which the panel control circuit 228 detected finger contact.

For example, as illustrated in the touch panel displays 5a-5c of FIG. 5 above, the indication of a preset value that corresponds to a position at which contact is detected, which is displayed in the set value display area 206b, is changed to the indication with the reverse video 217 or the selection frame 216, the blinking indication 218, or the like. Moreover, the camera body CPU 121 detects an area at which contact is detected from the lens state data 231 obtained in the synchronous communication, and instructs the display circuit 128 to change a preset value indicator that corresponds to the detected position within the set value indicator 117 displayed on the rear monitor 105 or the EVF (not illustrated) as illustrated in FIG. 8. For example, as illustrated in the selection state indications 9a-9c of FIG. 9, the preset value indicator corresponding to the detected position in the set value indicator 117 is changed to the indication with the reverse video 217 or the selection frame 216, the blinking indication 218, or the like. In this example, the indication of the case in which the touch position detection area for setting and operation 208b (3 meters (m)) is touched in a preset focusing mode is illustrated. In step S135, the lens CPU 221 starts a press-and-hold detection timer. This timer measures the duration of time that a finger is continuously contacting the touch panel 206, in order to determine to shift to a set-value change mode. In step S136, the lens CPU 221 determines whether the contact position of a finger is changed on the touch position detection areas for setting and operation 208a-208d, and when it is changed, the operation proceeds to step S137. When it is not changed, the operation proceeds to step S139. The contact position is detected in a similar manner to step S132. In step S137, the lens CPU 221 changes the indication that corresponds to the contact position of a finger according to the latest area detected by the panel control circuit 228. The display method is similar to that of step S134. In step S138, the lens CPU 221 restarts the press-and-hold detection timer for producing a decision to shift the mode to a preset value changing mode.

In step S139, the lens CPU 221 determines whether the panel control circuit 228 has detected that a finger is separated from the touch position detection areas for setting and operation 208a-208d, and when it is detected, the operation proceeds to step S140. When it is not detected, the operation proceeds to step S141. The contact state is detected in a similar manner to step S132. In step S140, the lens CPU 221 executes a preset operation according to the set preset operation mode and the preset value of the area in which contact was detected just before a finger was separated from the touch position detection areas for setting and operation 208a-208d. For example, when the preset operation mode is the preset focusing mode, the focusing lens drive circuit 222 and the focusing lens position detector 223 drive the focusing lens 203 to a preset position that corresponds to the selected distance. When the preset operation mode is the preset zoom mode, the zoom lens drive circuit 224 and the zoom position detector 225 drive the zoom lens 204 to a preset position that corresponds to the selected focal length. When the preset operation mode is the preset stop mode, the stop drive circuit 226 drives the stop 205 to a preset position that corresponds to the selected F value.

In step S141, the lens CPU 221 determines whether the press-and-hold detection timer has measured the time for a specified period of time, for example, for two seconds or longer. When the specified period of time has passed, the operation proceeds to step S142, and the mode shifts to the set-value change mode. When the specified period of time has not passed, the operation returns to step S136. In step S142, the lens CPU 221 changes the set value display of the touch panel 206 at a position that corresponds to an area in which finger contact is detected by panel control circuit 228 within the touch position detection areas for setting and operation 208a-208d, from the selected indication to the setting change display.

For example, if the selected preset value indicator in the preset value display area 206bp is indicated as selected with the reverse video 217 as illustrated in the touch panel display 5a of FIG. 5, the display is changed to the display with the selection frame 216 or the blinking indication 218 as illustrated in the touch panel display 5b and the touch panel display 5c of FIG. 5. Moreover, the camera body CPU 121 detects an area in which press-and-hold is detected from the lens state data 231 obtained in the synchronous communication, and changes a preset value indicator that corresponds to the detected position in the set value indicator 117, which is displayed on the rear monitor 105 or the EVF (not illustrated)

as illustrated in FIG. 8, from the selected indication to the setting change display. For example, when the preset value indicator that corresponds to the detected position in the set value indicator 117 is indicated as selected with the reverse video 217 as illustrated in the selection state indication 9a of FIG. 9. This indication is changed to the indication of the selection frame 216 or the blinking indication 218 as illustrated in the selection state indication 9b and the selection state indication 9c of FIG. 9.

In step S143, the lens CPU 221 starts a standby-time-for-change-operation detection timer. This timer measures the duration of time that a finger is continuously not contacting the touch panel 206, in order to determine that the set value is not yet changed. In step S144, the lens CPU 221 determines whether the standby-time-for-change-operation detection timer has measured the time for a specified period of time, for example, for ten seconds or longer. When the specified period of time has passed, the operation proceeds to step S151. When the specified period of time has not passed, the operation proceeds to S145. In step S145, the lens CPU 221 determines whether the panel control circuit 228 has detected that a finger contacted set-value change object area in the touch position detection areas for setting and operation 208a-208d. When it was detected, the operation proceeds to step S146. When it was not detected, the operation returns to step S144. In step S146, the lens CPU 221 restarts the press-and-hold detection timer to determine whether the changed set value has become definite. In step S147, the lens CPU 221 determines whether the panel control circuit 228 has detected that a finger was separated from a set-value change object area on the touch position detection areas for setting and operation 208a-208d. When it was detected, the operation proceeds to step S148. When it was not detected, the operation proceeds to S150. The contact state is detected in a similar manner to step S132. In step S148, the lens CPU 221 changes the set value of a set-value change object area on the touch position detection areas for setting and operation 208a-208d. In the changing process of a set value, as illustrated in the changing order of display 10b of FIG. 10 for example, a register value or the like for setting preset values in the lens CPU 221 is changed according to preliminarily prepared set values and the order of setting. Moreover, the panel control circuit 228 or the display circuit 128 also changes the set value display area 206b of the touch panel 206, or a preset value indicator to be changed on the rear monitor 105 or the set value indicator 117 of the EVF (not illustrated).

In step S149, the lens CPU 221 restarts the press-and-hold detection timer to determine how long a finger is not contacting the touch panel 206, and the operation returns to step S145. In step S150, the lens CPU 221 determines whether the press-and-hold detection timer has measured the time for a specified period of time, for example, for two seconds or longer. When the specified period of time has passed, the operation proceeds to step S151. When the specified period of time has not passed, the operation returns to step S147. In step S151, the lens CPU 221 instructs the panel control circuit 228 to return the display of the touch panel 206 to a normal operation acceptance state of the setting and operation, and terminates the set-value change mode. At this time, the camera body CPU 121 detects the termination of the set-value change mode from the lens state data 231 obtained in the synchronous communication, and instructs the display circuit 128 to return the display of the rear monitor 105 or the EVF (not illustrated) to a normal operation acceptance state of the setting and operation.

In step S152, the lens CPU 221 starts the press-and-hold detection timer. This timer measures the duration of time that a finger is continuously contacting the touch panel 206, in order to determine whether the operation acceptance state of the touch panel 206 has been shifted to a disabled state. In step S153, the lens CPU 221 determines whether the panel control circuit 228 has detected that a finger was separated from the touch position detection area for operation mode selection 208e. When it was detected, the operation proceeds to step S154. When it was not detected, the operation proceeds to step S155. In step S154, the lens CPU 221 changes the operation mode. In the changing process of an operation mode, as illustrated in the changing order of display 10a of FIG. 10 for example, a register value or the like for setting operation modes in the lens CPU 221 is changed according to preliminarily prepared operation modes and the order of setting. Moreover, the panel control circuit 228 or the display circuit 128 also changes the preset operation mode display area 206ap of the touch panel 206, or the display of the operation mode indicator 116 on the rear monitor 105 or the EVF (not illustrated).

In step S155, the lens CPU 221 determines whether the press-and-hold detection timer has measured the time for a specified period of time, for example, for two seconds or longer. When the specified period of time has passed, the operation proceeds to step S156. When the specified period of time has not passed, the operation returns to step S153. In step S156, the lens CPU 221 sets the operation acceptance state of the touch panel 206 to a disabled state, and instructs the panel control circuit 228 to set the display of the touch panel 206 to a non-display state. Moreover, the camera body CPU 121 detects an operation acceptance disabled state of the touch panel 206 from the lens state data 231 obtained in the synchronous communication, and sets the operation mode indicator 116 and the set value indicator 117 displayed on the rear monitor 105 or the EVF (not illustrated) to a non-display state. In step S157, the lens CPU 221 determines whether the panel control circuit 228 has detected that a finger contacted the touch position detection areas of the touch panel 206 for operation mode selection 208e. When it was detected, the operation proceeds to step S158. When it was not detected, the operation returns.

In step S158, the lens CPU 221 starts the press-and-hold detection timer. This timer measures the duration of time that a finger is continuously contacting the touch panel 206, in order to determine whether the operation acceptance state of the touch panel 206 has been shifted to an enabled state. In step S159, the lens CPU 221 determines whether the panel control circuit 228 has detected that a finger was separated from the touch position detection area for operation mode selection 208e. When it was detected, the operation returns. When it was not detected, the operation proceeds to step S160. In step S160, the lens CPU 221 determines whether the press-and-hold detection timer has measured the time for a specified period of time, for example, for two seconds or longer. When the specified period of time has passed, the operation proceeds to step S161. When the specified period of time has not passed, the operation returns to step S159. In step S161, the lens CPU 221 sets the operation acceptance state of the touch panel 206 to an enabled state, and instructs the panel control circuit 228 to set the display of the touch panel 206 to a displaying state. Moreover, the camera body CPU 121 detects an operation acceptance enabled state of the touch panel 206 from the lens state data 231 obtained in the synchronous communication, and sets the operation mode indicator 116 and the set value indicator 117, which are not displayed on the rear monitor 105 or the EVF (not illustrated), to a displaying state.

According to Embodiment 1 as explained above, preset operations may be performed under various types of capturing conditions with a minimum contact operations of a finger and one-touch on the touch panel 206 arranged on the interchangeable lens 201, and thus the interchangeable lens 201 and the camera system 100 with good operability may be provided. In regard to the contact operations on the touch panel 206, the contact positions on the touch panel 206 may be checked on the indicators 207 arranged in a specified positional relationship with the touch panel 206. Thus, the touch panel 206 may be operated in a precise manner without viewing the touch panel 206. Moreover, the camera body 101 is gripped with a right hand and the interchangeable lens 201 is supported by a left hand from the bottom, and thus preset operations may be performed only with the touch operations of a left hand thumb on the touch panel 206 and unnecessary sound is not caused due to the operations. As operations may be made with the camera system 100 securely held, video recording may be performed without loss of video quality even when the preset operations are made during the video recording.

Some modifications will be explained below. In the explanation above, the touch panel 206 having a monitor display on its preset operation unit is used. However, for example, an operating member without display function such as a touchpad may be used, and operation modes, set values, or the like may be displayed only on the rear monitor 105 of the camera body 101 and the EVF (not illustrated). The setting of enabling/disabling the operations on the touch panel 206, or an operation mode change or a set value change are performed by the touch operations on the touch panel 206, but a different type of member such as a button or a dial may be used. The direction of position detection of the touch panel 206 is not limited to the direction parallel to the optical axis direction of the interchangeable lens 201 (axial direction of the barrel 201*a*). The touch panel 206 may be arranged in such a manner that the longitudinal direction becomes vertical against the optical axis, and may operate position detection in the vertical direction. The operations of setting change with respect to the AF/photometry mode or shutter speed, the ISO sensitivity, capturing operations by the camera body such as the strobe light mode, the operation modes may be performed by touch operations on the touch panel 206 of the interchangeable lens 201.

Embodiment 2

In the present Embodiment 2, examples of the case in which the operations of changing the capturing setting such as the AF mode or shutter speed are performed by the touch operations on the touch panel 206 of the interchangeable lens 201 will be explained.

The basic configuration, capturing operation, or the like of the interchangeable lens 201 and the camera body 101 according to the present embodiment 2 are similar to those of Embodiment 1 exemplified above in FIG. 2, FIG. 3, or the like.

Moreover, the basic configuration, capturing operation, or the like of the interchangeable lens 201 and the camera body 101 according to the present embodiment 2 are similar to those of Embodiment 1 exemplified above in FIG. 6, FIGS. 7A and 7B, or the like.

Figure 13:
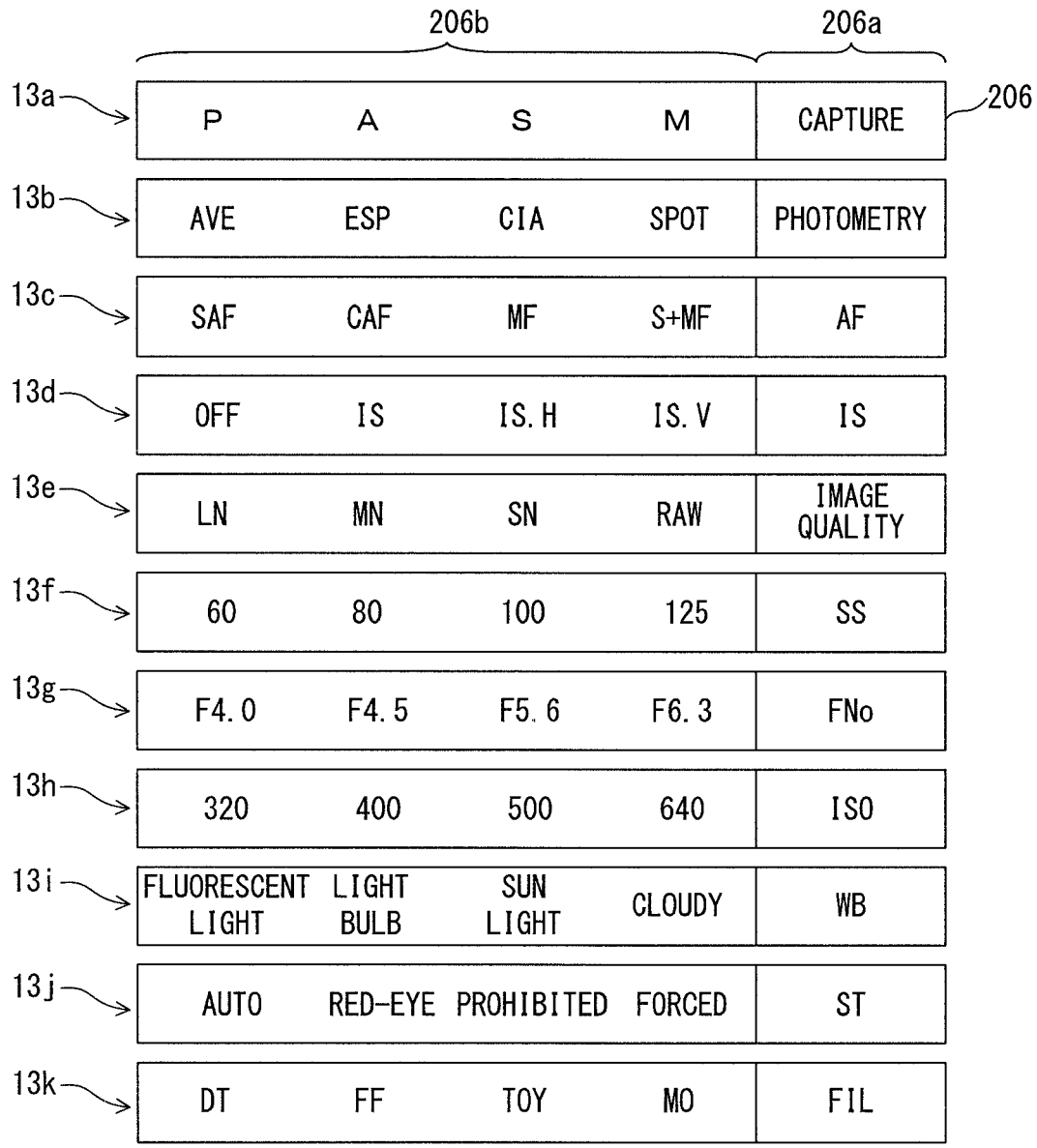
FIG. 13 is an example of the touch panel of the interchangeable lens display according to Embodiment 2 of the present invention.

FIG. 13 is an example of the touch panel of the interchangeable lens display according to Embodiment 2 of the present invention.

In FIG. 13, various types of examples of display on the operation mode display area 206*a* (second area) and the operation mode set value display area 206*b* (first area) of the aforementioned touch panel 206 are depicted.

Figure 14:
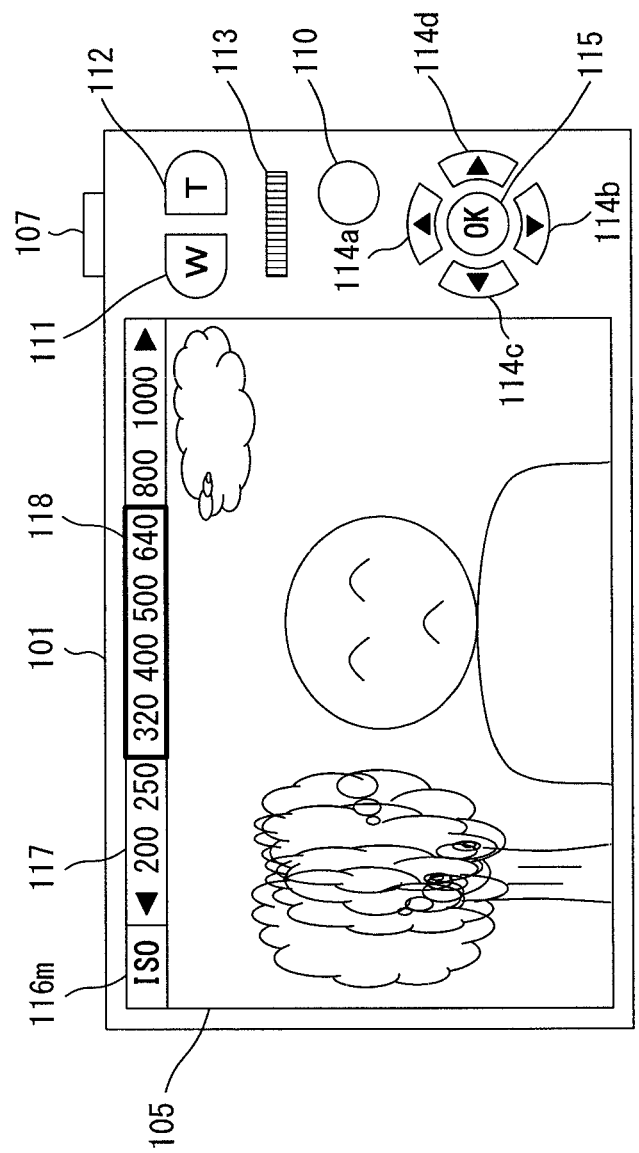
FIG. 14 illustrates an example of the selection mode indication on the rear monitor of a camera body according to Embodiment 2 of the present invention.
Figure 17A:
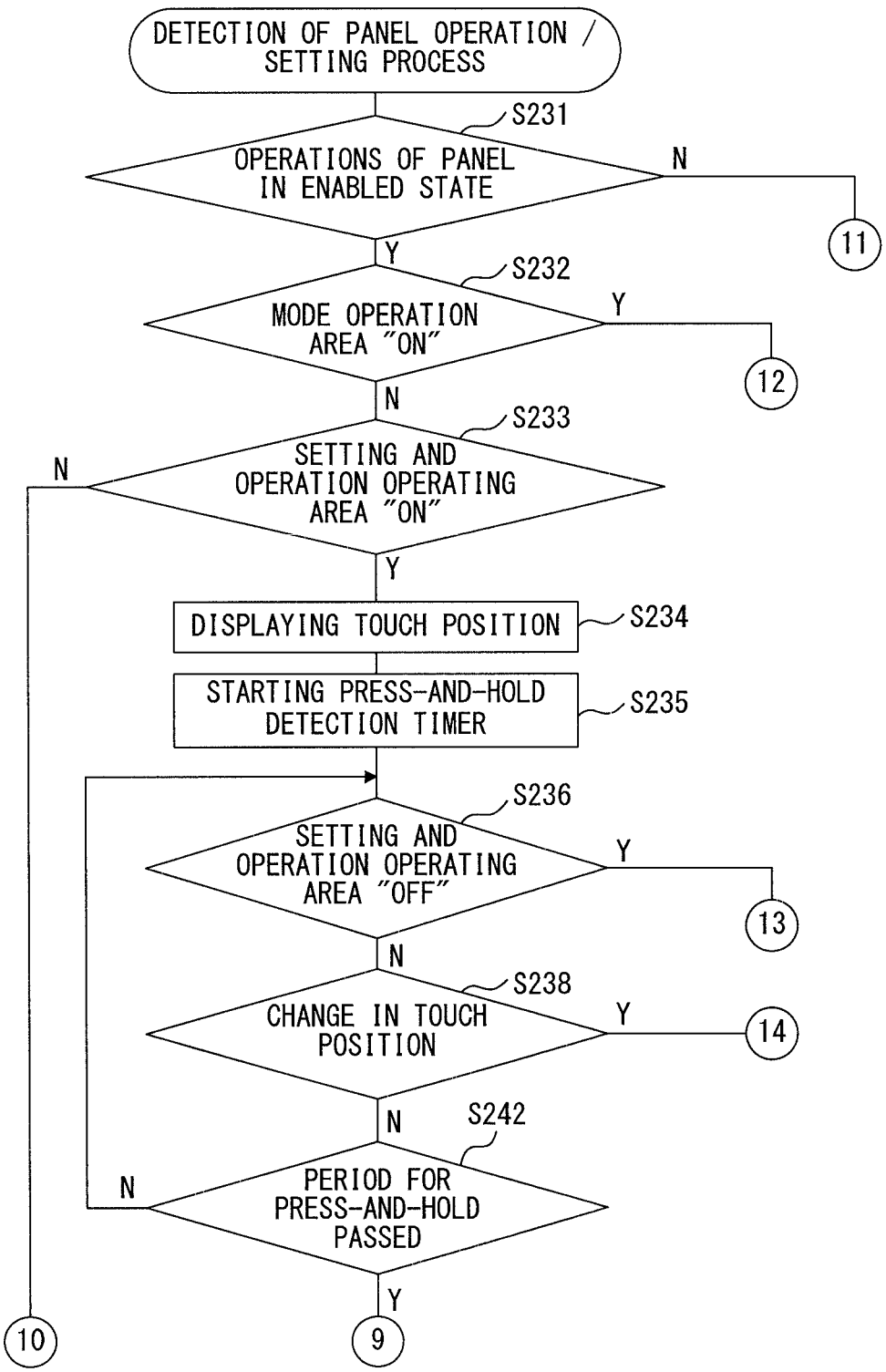
Figure 17C:
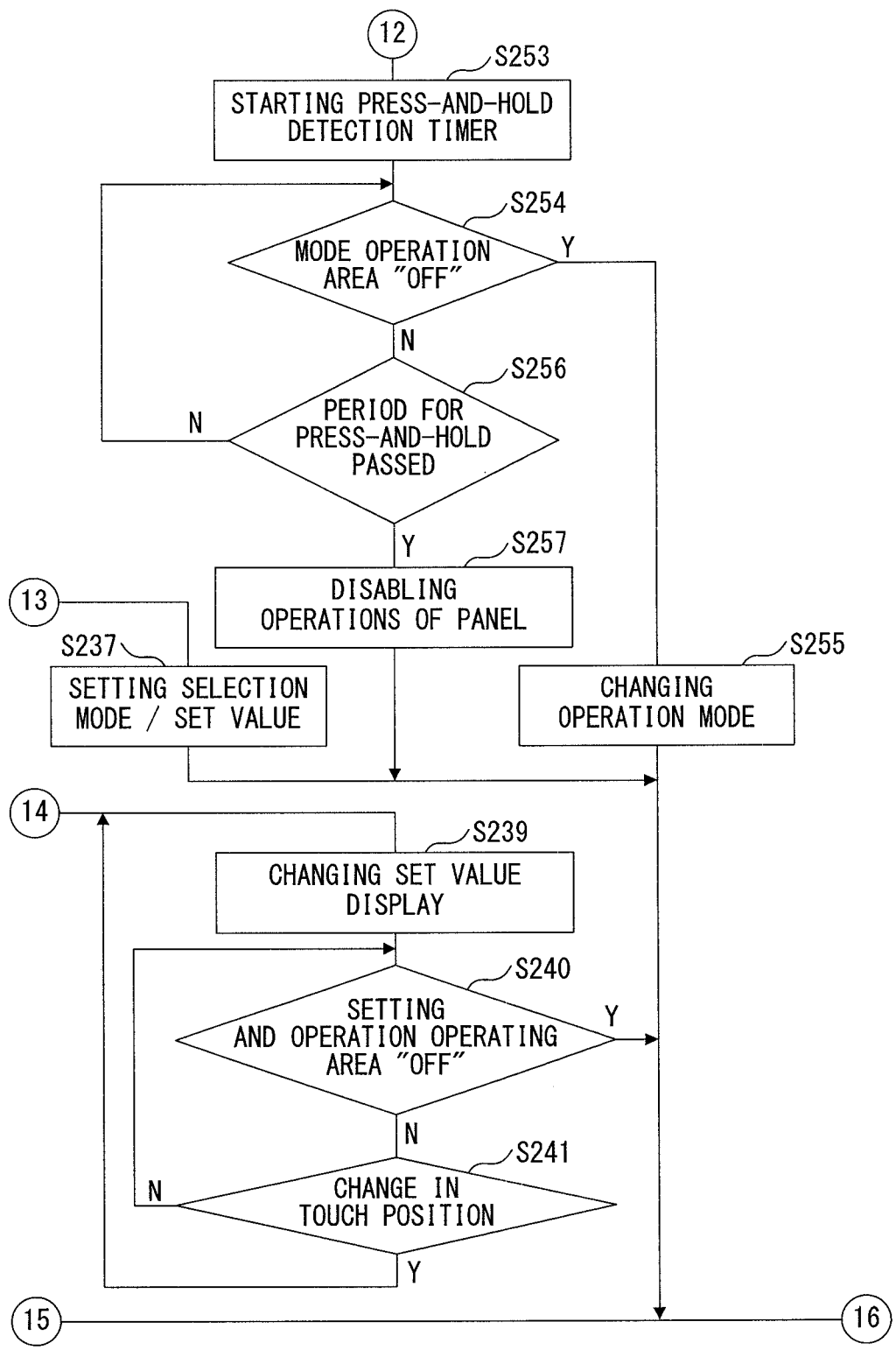
Figure 17D:
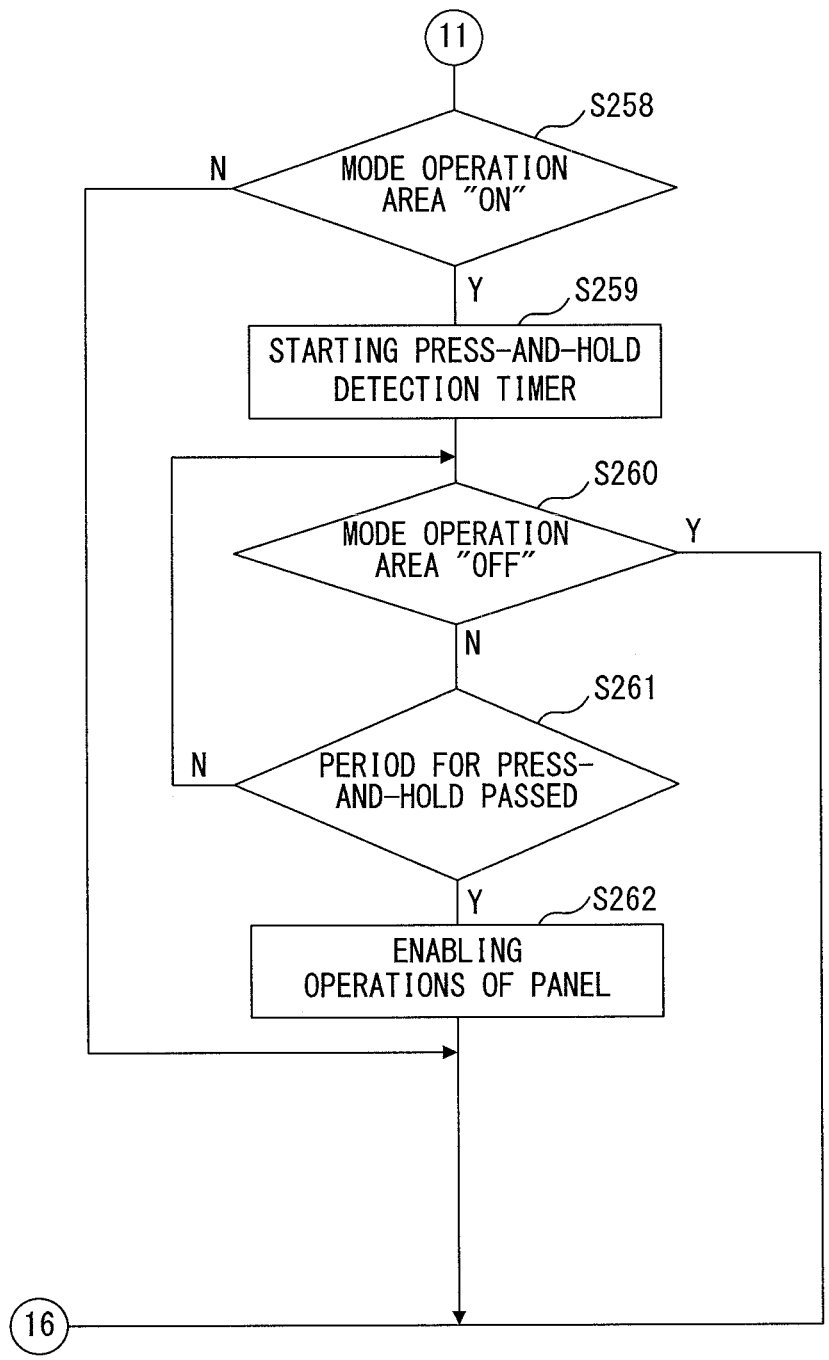
Figure 19A:
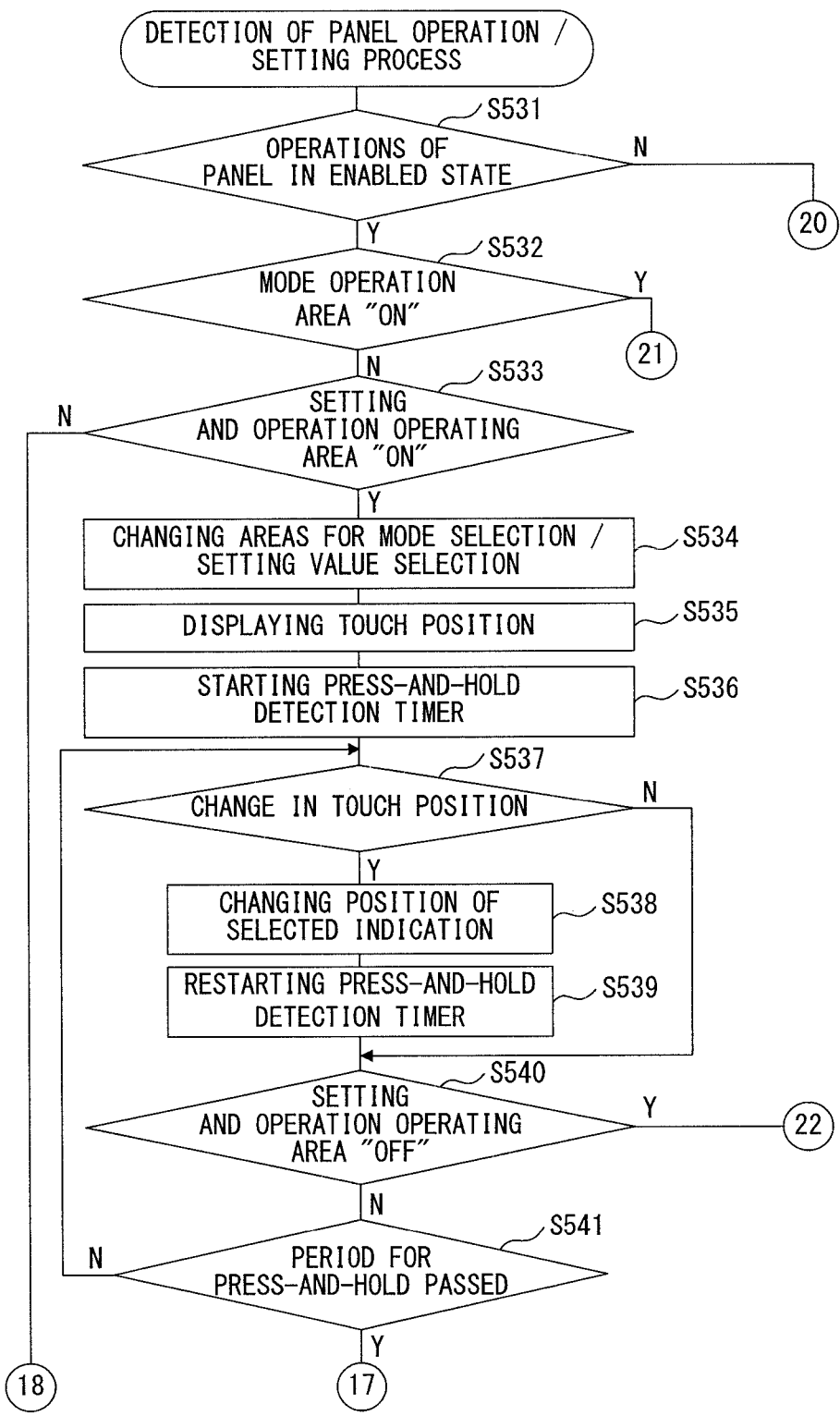
FIGS. 19A, 19B, 19C, 19D are flowcharts explaining an example of the processes related to preset operations of an interchangeable lens according to embodiment 3 of the present invention.
Figure 19B:
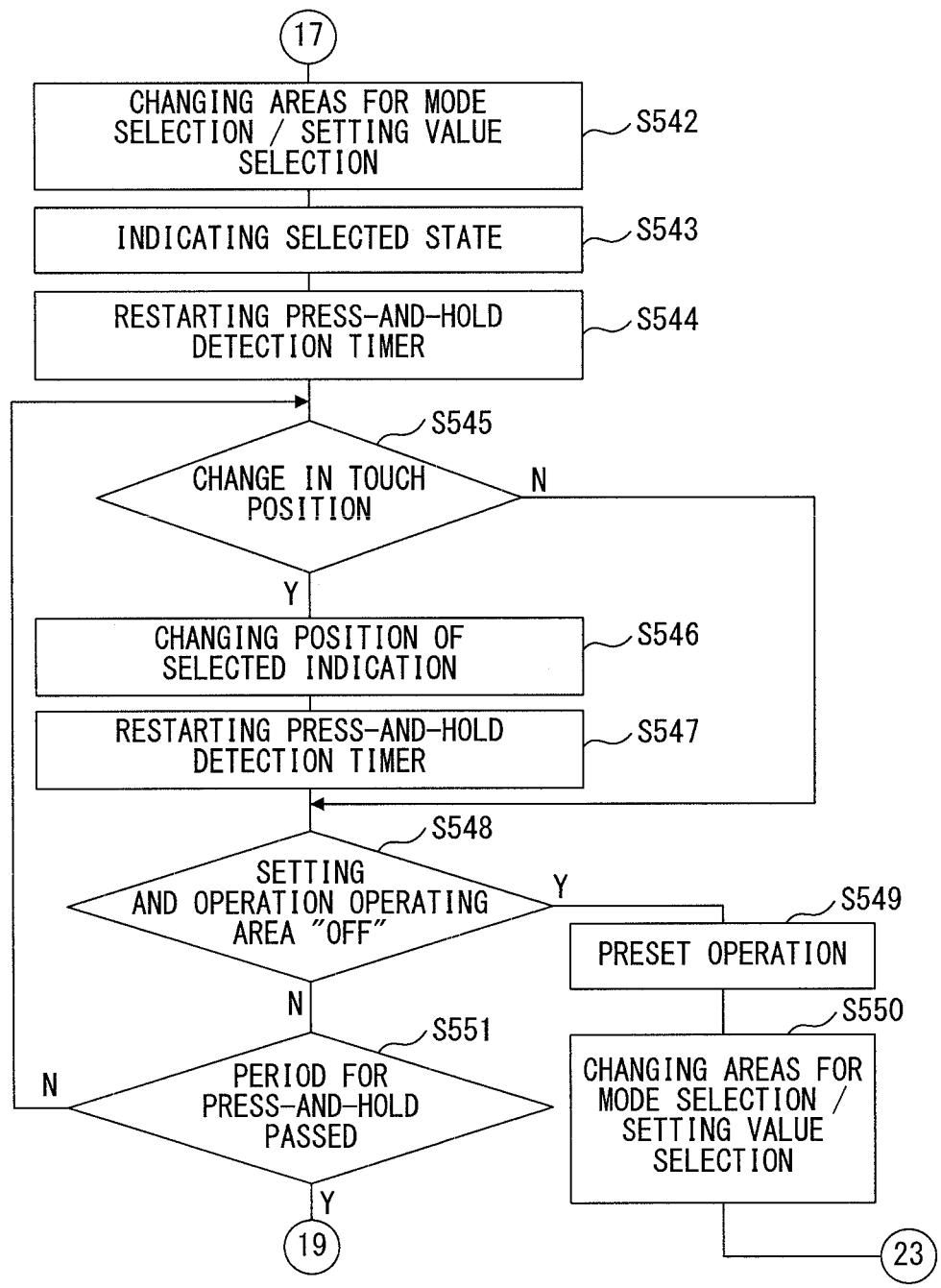
Figure 19C:
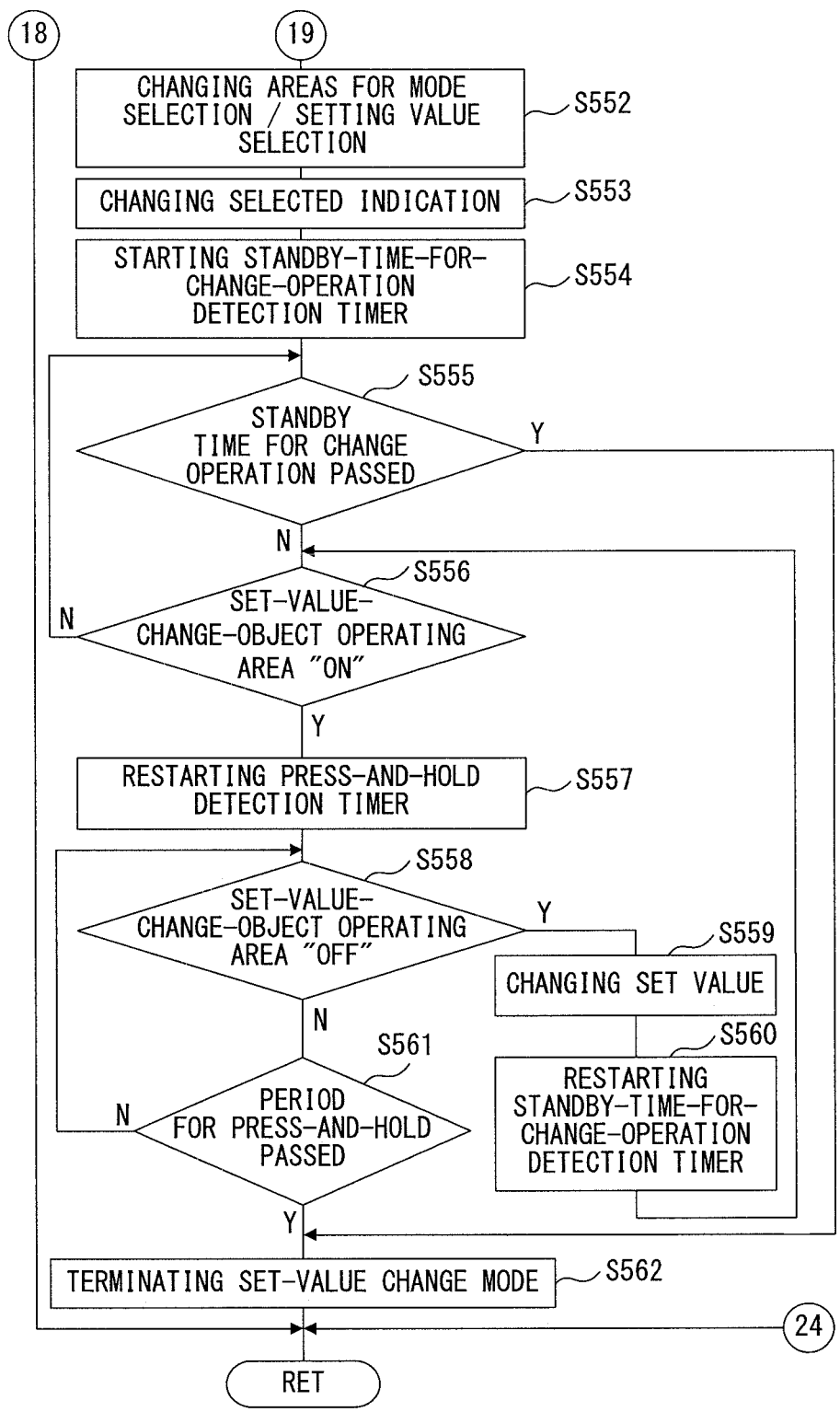
Figure 19D:
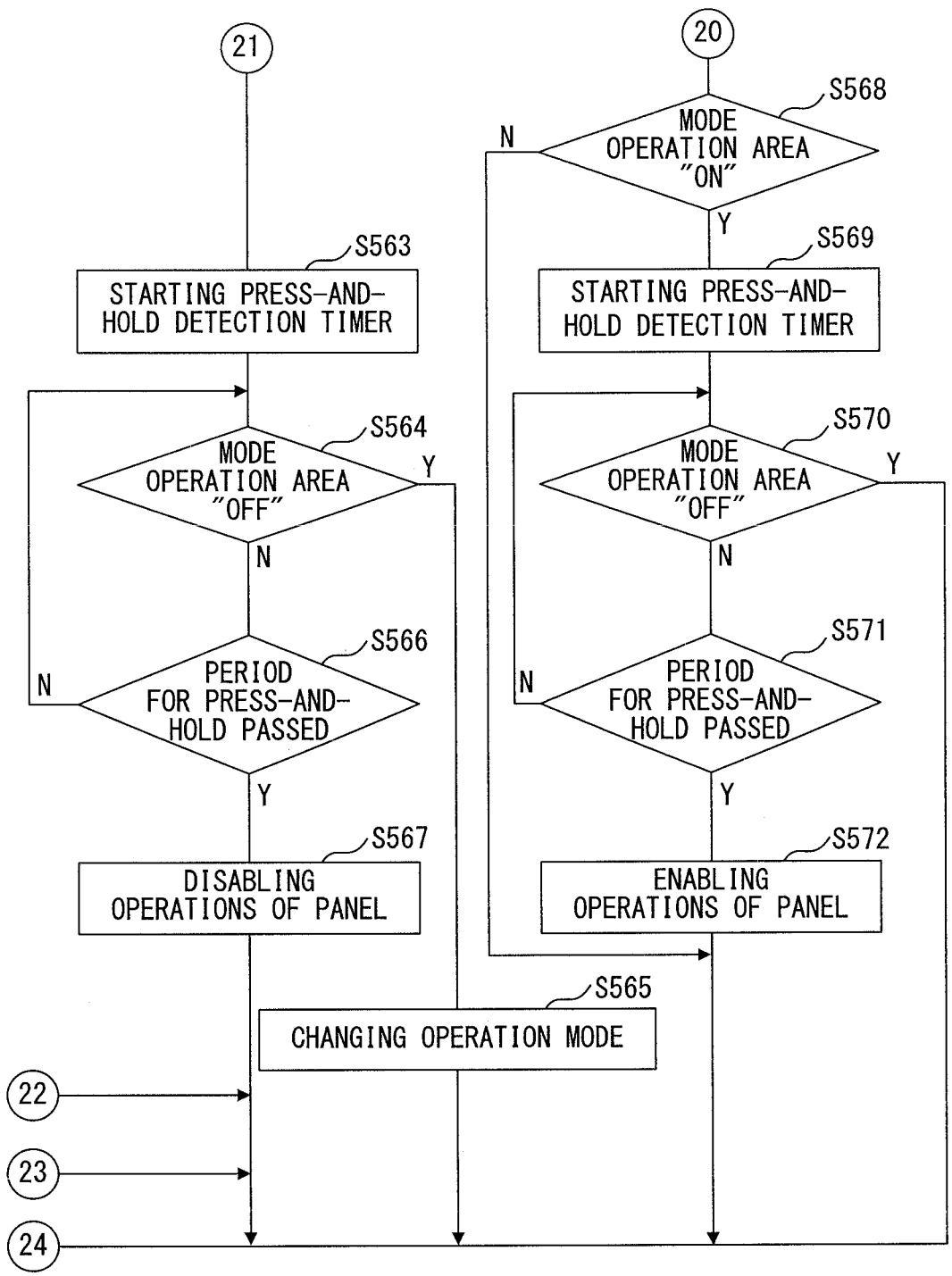

A touch panel display 13*a* depicts an example of the touch panel display in a capture selection mode where the selection of capture modes is performed. A touch panel display 13*b* depicts an example of the touch panel display in a photometry selection mode where the selection of photometry modes is performed. A touch panel display 13*c* depicts an example of the touch panel display in an AF selection mode where the selection of AF modes is performed. A touch panel display 13*d* depicts an example of the touch panel display in an image stabilization selection mode where the selection of image stabilization modes is performed. A touch panel display 13*e* depicts an example of the touch panel display in an image quality selection mode where the selection of image quality modes is performed. A touch panel display 13*f* depicts an example of the touch panel display in a shutter speed selection mode where the selection of shutter speed setting is performed. A touch panel display 13*g* depicts an example of the touch panel display in a stop selection mode where the selection of stop setting is performed. A touch panel display 13*h* depicts an example of the touch panel display in an ISO sensitivity selection mode where the selection of ISO sensitivity setting is performed. A touch panel display 13*i* depicts an example of the touch panel display in a white balance selection mode where the selection of white balance setting is performed. A touch panel display 13*j* depicts an example of the touch panel display in a strobe light flash selection mode where the selection of strobe light flash setting is performed. A touch panel display 13*k* depicts an example of the touch panel display in an image processing filter selection mode where the selection of image processing filter mode is performed. FIG. 14 illustrates an example of the selection mode indication on the rear monitor of a camera body according to Embodiment 2 of the present invention.

A capture setting mode indicator 116*m* and the set value indicator 117 are displayed on the rear monitor 105.

A one-touch selection range frame 118 arranged within the set value indicator 117 indicates a range of capture setting that is one-touch selectable by operations on the touch panel 206 of the interchangeable lens 201.

When the operation on the touch panel 206 is in an enabled state, as illustrated in FIG. 13, a selected capture setting mode is displayed on the operation mode display area 206*a* of the touch panel 206, and selectable capture set values corresponding to the selected mode are displayed on the set value display area 206*b* at positions corresponding to the touch position detection areas 208*a*-208*e*.

At the same time, the capture setting mode indicator 116*m* as displayed on the touch panel 206 is also displayed on the rear monitor 105 of the camera body 101 and the EVF (not illustrated), as illustrated in FIG. 14.

The capture set value is displayed as in the set value indicator 117, and what is displayed in the touch panel 206 is displayed with the surrounding one-touch selection range frame 118.

A photographer may select a set value in accordance with a capture setting mode such as the photometry mode by touching a portion of the capture set value display within the set value display area 206*b* of the touch panel 206 with a finger.

How the touched portion is displayed when a touch operation is performed by a photographer is similar to Embodiment 1.

FIG. 15 depicts an example of the process of changing the capture setup display within the range of one-touch selection on the rear monitor of the camera body according to Embodiment 2 of the present invention.

A display 15a is example of the display in the range of one-touch selection before the process of changing the capture setup display. A capture setup display 15b is an example of the capture setup display in the range of one-touch selection when the range of one-touch selection is changed by a slide operation to the right on the touch panel 206 of the interchangeable lens 201. A capture setup display 15c is an example of the capture setup display in the range of one-touch selection when the range of one-touch selection is changed by a slide operation to the left on the touch panel 206 of the interchangeable lens 201. FIG. 16 depicts an example of the touch panel display when the one-touch selectable capture setting is changed by a slide operation on the touch panel of the interchangeable lens according to Embodiment 2 of the present invention.

A set value display 16a is example of the set value display on the touch panel before the process of changing the set value in the one-touch selectable range. A set value display 16b is example of the set value display on the touch panel when the one-touch selectable capture setting is changed by a slide operation to the right on the touch panel 206 of the interchangeable lens 201. A set value display 16c is example of the set value display on the touch panel when the one-touch selectable capture setting is changed by a slide operation to the left on the touch panel 206 of the interchangeable lens 201. The capture setting mode may be changed as a photographer touches a portion of the capture setting mode indication on the touch panel 206 (operation mode display area 206a) with a finger in a similar manner to Embodiment 1, and every time a display portion is touched, the capture setting mode indication on the touch panel 206 and the rear monitor 105 of the camera body 101 or the EVF (not illustrated) is switched in a similar manner to the example of the aforementioned changing order of display 10a of FIG. 10, thereby changing the capture setting mode.

The capture set value is changed as a photographer contacts a portion of the set value display area 206b of the touch panel 206 with a finger and slides his/her finger to the right and left.

For example, it is assumed that the rear monitor 105 and the display of the touch panel 206 before change are in a state as depicted in the display 15a of FIG. 15 and the set value display 16a of FIG. 16. If a photographer slides a finger on the touch panel 206 to the right, the display shifts to the right as in the capture setup display 15b of FIG. 15 and the set value display 16b of FIG. 16. If a photographer slides a finger on the touch panel 206 to the left, the display shifts to the right as in the capture setup display 15c of FIG. 15 and the set value display 16c of FIG. 16. As a result, the set values are displayed as explained above, and operable set values are changed.

The set value may be changed individually for each operating position in a similar manner to Embodiment 1. For example, a portion of the set value display area 206b is pressed and held such that the display shifts to the set-value change mode, and after the set value is changed by a touch operation, the change is determined as the portion of the set value display area 206b is pressed and held again.

With reference to the flowchart of FIGS. 17A, 17B, 17C, 17D, an example of the operation on the touch panel 206 of the interchangeable lens 201 according to the present embodiment 2 will be explained in detail.

FIGS. 17A, 17B, 17C, 17D are a flowchart illustrating an example of the operations related to the operation of capture setting selection by the interchangeable lens according to Embodiment 2 of the present invention.

(Step S231-Step S235)

In steps S231 to S235, it is determined whether the operation is to be shifted according to the operative condition of the touch panel 206, in a similar manner to steps S131 to S135 above. When the operation acceptance state is disabled in the touch panel 206, the operation proceeds to step S258. When it was detected that a finger of a photographer contacted the touch position detection area for operation mode selection 208e, the operation proceeds to step S253. When it was not detected that a finger of a photographer contacted the touch position detection areas for setting and operation 208a-208d, the operation returns.

In the other cases, the set value display on the touch panel 206 on which finger contact is detected is changed to the selected indication, and the press-and-hold detection timer is started.

In step S236, the lens CPU 221 determines whether the panel control circuit 228 has detected that a finger of a photographer was separated from the touch position detection areas for setting and operation 208a-208d. When it was detected, the operation proceeds to step S237. When it was not detected, the operation proceeds to step S238.

The contact state is detected in a similar manner to step S132.

In step S237, the lens CPU 221 updates the data corresponding to the lens state data 231 according to the set capture setting mode and a capture set value of the area in which contact is detected immediately before a finger of a photographer is separated from the touch position detection areas for setting and operation 208a-208d, and changes the set value display of the corresponding touch panel 206 to the selected indication of the indication with the reverse video 217 or the selection frame 216, the blinking indication 218, or the like in a similar manner to Embodiment 1.

The camera body CPU 121 obtains the updated lens state data 231 in synchronous communication, and changes the setting of the camera body 101 which corresponds to the updated capture set value. At the same time, the camera body CPU 121 changes the indication which corresponds to the selected set value in the set value indicator 117 displayed on the rear monitor 105 and the EVF (not illustrated) to the selected indication including the indication with the reverse video 217 or the selection frame 216, the blinking indication 218, or the like, in a similar manner to Embodiment 1.

In step S238, the lens CPU 221 determines whether or not the contact position of a finger of a photographer has been changed in the touch position detection areas for setting and operation 208a-208d. When it has been changed, the operation proceeds to step S239. When it has not been changed, the operation proceeds to step S242.

The contact position is detected in a similar manner to step S132.

In step S239, the set value display is changed according to the change in direction and the amount of change of the contact position of a finger of a photographer, which was detected in step S238.

The lens CPU 221 instructs the panel control circuit 228 to change the display of the set value display area 206b of the touch panel 206.

For example, if the state of the display is as depicted in the set value display 16a of FIG. 16 before a change is made and the contact position of a finger is changed from the touch position detection area for operation mode selection 208a to the touch position detection area for operation mode selection 208d, the display of "320" displayed at the position of the touch position detection area for operation mode selection 208a is displayed at the position of the touch position detection areas for operation mode selection 208d, as depicted in the set value display 16*b* of FIG. 16. Then, set values smaller than "320", which is preliminarily set, are displayed at the positions of the touch position detection areas for operation mode selection 208*a*-208*c*. If the contact position of a finger is changed from the touch position detection area for operation mode selection 208*d* to the touch position detection area for operation mode selection 208*a*, the display of "640" displayed at the position of the touch position detection area for operation mode selection 208*d* is displayed at the position of the touch position detection areas for operation mode selection 208*a*, as depicted in the set value display 16*c* of FIG. 16. Then, set values larger than "640", which is preliminarily set, are displayed at the positions of the touch position detection areas for operation mode selection 208*b*-208*d*.

If there are insufficient number of set values to be displayed at blank positions after the display position of a set value of the contact position of a finger is changed, the display position is changed up to the position where there are sufficient number of set values.

For example, if it is assumed that the set values smaller than "320" are up to "200" in the example where the indication of "320" of ISO is moved from the position of the touch position detection area for operation mode selection 208*a* to the position of the touch position detection area for operation mode selection 208*d*, the indication of "320" is changed to the position of the touch position detection areas for operation mode selection 208*c*, and the indications of "200", "250", and "400" are displayed at the positions of the touch position detection areas for operation mode selection 208*a*, 208*b*, and 208*d*, respectively.

The lens CPU 221 updates the data which is stored in the memory 227 and is used for actual capture setting, with the data which corresponds to the set value after the display position is changed (lens state data 231).

The camera body CPU 121 detects that selectable capture set values are changed according to the lens state data 231 obtained in the synchronous communication, and changes the display of the set value indicator 117 in such a manner that the set value display of the set value display area 206*b* of the touch panel 206 will match the display within the one-touch selection range frame 118 on the rear monitor 105 and the EVF (not illustrated).

In step S240, the lens CPU 221 determines whether the panel control circuit 228 has detected that a finger of a photographer was separated from the touch position detection areas for setting and operation 208*a*-208*d*. When it was detected, the operation returns. When it was not detected, the operation proceeds to step S241. The contact state is detected in a similar manner to step S132.

In step S241, the lens CPU 221 determines whether or not the contact position of a finger of a photographer has been changed in the touch position detection areas for setting and operation 208*a*-208*d*. When it has been changed, the operation returns to step S239. When it has not been changed, the operation returns to step S240.

The contact position is detected in a similar manner to step S132.

In steps S242 to S252, whether or not the set-value change mode should be shifted is determined, and the operation of changing a set value is performed, in a similar manner to steps S141 to S151.

In steps S253 to S257, the operation of selecting an operation mode is performed, and whether or not the touch panel 206 should shift to an operation acceptance disabled state is determined, in a similar manner to steps S152 to S156.

In steps S258 to S262, whether or not the touch panel 206 should shift to an operation acceptance enabled state is determined in a similar manner to steps S157 to S161.

According to Embodiment 2 as explained above, it becomes possible to provide an interchangeable lens and a camera system with good operability where the capture setting of a camera body may be changed by one touch while maintaining good HOLD status during the capturing process, in a similar manner to Embodiment 1.

Embodiment 3

The present Embodiment 3 relates to the operations of the touch panel 206 on the interchangeable lens 201. In the present Embodiment 3, the contact position of a finger is two-dimensionally detected, and the lens is operated by selecting an operation mode by the touch position in the vertical direction (circumferential direction of the barrel 201*a*) and selecting a set value by the touch position in the horizontal direction (optical axis direction of the barrel 201*a*) in sequence. The basic configuration, capturing operation, or the like of the interchangeable lens 201 and the camera body 101 according to the present embodiment 3 are similar to those of Embodiment 1 exemplified above in FIG. 2, FIG. 3, or the like. FIGS. 18A, 18B, 18C depict an example of the touch position detection area and the display on the touch panel of the interchangeable lens according to Embodiment 3 of the present invention. A touch position detection area 33*a* depicts an example in which finger contact is not yet made, and a touch position detection 33*b* depicts an example in which an operation mode is selected. A touch position detection 33*c* depicts an example in which an operational setting value is selected. A touch panel display 33*d* depicts an example of the display in which contact is detected for the first time from a state in which finger contact is not yet made. A touch panel display 33*e* depicts an example of the display in which an operation mode is selected, and a touch panel display 33*f* depicts an example of the display in which an operational setting value is selected. A touch panel operation display 33*g* depicts an example of the display on the rear monitor 105 of the camera body 101 in which contact is detected for the first time from a state in which finger contact is not yet made. A touch panel operation display 33*h* depicts an example of the display on the rear monitor 105 of the camera body 101 in which an operation mode is selected, and a touch panel operation display 33*i* depicts an example of the display on the rear monitor 105 of the camera body 101 in which an operational setting value is selected. On the touch panel operation displays 33*g*-33*i*, the selection frame 120 is used for selecting an operational setting value of the touch panel operation display on the rear monitor 105 of the camera body 101.

In regard to the operation mode display area 206*a* and the set value display area 206*b* of the touch panel 206, refer to the explanations of FIG. 4 in the above. In the touch position detection areas 33*a*-33*c*, a contact detection position 213*a* indicates the touch position at which contact is detected for the first time from a state in which finger contact of a photographer is not yet made. In a similar manner, a contact detection position 213*b* indicates the touch position at which an operation mode is selected. In a similar manner, a contact detection position 213*c* indicates the touch position at which an operational setting value is selected. Divided areas for operation mode selection 214*a*-214*c* indicate detection areas for selecting an operation mode. Divided areas for operational setting value selection 215*a*-215*e* indicate detection areas for selecting an operational setting value. The selection frame 216 in the touch panel displays 33d-33f indicates the position at which an operational setting value is selected on the touch panel 206. When the operations on the touch panel 206 are in an enabled state, as depicted in the touch panel displays 33d-33f, selectable operation modes are displayed on the operation mode display area 206a of the touch panel 206 at positions that correspond to divided areas for operation mode selection 214a-214c depicted in the touch position detection area 33a and the touch position detection area set as the divided area for operational setting value selection 215e. Moreover, selectable preset values corresponding to the operation modes are displayed in the set value display area 206b at positions that correspond to the divided areas for operation mode selection 214a-214c depicted in the touch position detection area 33a and the touch position detection areas set as divided areas for operational setting value selection 215a-215d. Then, the portions of an operation mode and a preset value selected by touch operation are displayed with the indication of the reverse video or the selection frame 216.

Also on the rear monitor 105 of the camera body 101, the preset value indicator 117p that corresponds to the operation mode indicator 116 and the selection mode same as the mode selected on the touch panel 206 depicted in the touch panel operation displays 33g-33i of FIGS. 18A, 18B, 18C is displayed, and the selected preset value is displayed with the selection frame 120. A photographer may perform the operation of selecting an operation mode or a preset value, the operation of executing a preset operation, or the like by performing operations such as touch, slide, press-and-hold, or the like on the touch panel 206. For example, if a touch operation is performed and the contact detection position 213a depicted in the touch position detection area 33a of FIG. 18A is detected, as depicted in the touch panel display 33d, preset zoom mode indication "PZ" on the touch panel 206 corresponding to the contact detection posit ion 213a is switched to the reverse video. Then, the preset value "30 mm" is displayed with the selection frame 216. Further, the preset zoom mode indication "PZ" is displayed at the operation mode indicator 116 on the rear monitor 105 as depicted in the touch panel operation display 33g, and "30 mm" of the preset value indicator 117p is displayed with the selection frame 120.

The setting of touch position detection areas by the divided areas for operational setting value selection 215a-215e depicted in the touch position detection 33b of FIG. 18B is released, and touch position detection areas for selecting an operation mode in which the area width of the divided areas for operation mode selection 214a-214c with reference to the contact detection position 213a is made narrower than before the operation is made are set. Next, if a photographer slides a finger to the upward and downward directions with the finger contacting the touch panel 206 to move the contact position to the contact detection position 213b depicted in the touch position detection 33b of FIG. 18B, the preset focusing mode indication "PF" on the touch panel 206, which corresponds to the contact detection position 213b depicted in the touch panel display 33e, is switched to the reverse video. Then, the selection frame 216 moves to the upward direction regardless of the position of the contact detection position 213b in the right and left directions, and preset value "3 m" is displayed with the selection frame 216. Further, as depicted in the touch panel operation display 33h, the operation mode indicator 116 on the rear monitor 105 is switched to the preset focusing mode indication "PF". The display position of the selection frame 120 of the preset value indicator 117p remains the same, and the preset value is changed to the value of the preset focusing mode.

If the slide operation is terminated in this state and the contact state of a finger on the touch panel 206 is maintained for specified period of time, the operation mode is determined to be the preset focusing mode. Then, the setting of touch position detection areas by the divided areas for operation mode selection 214a-214c depicted in the touch position detection 33c is released, and touch position detection areas for selecting an operational setting value in which the area width of the divided areas for operational setting value selection 215a-215d with reference to the contact detection position 213b is made narrower than before the operation is made are set. Further, if a finger is slid to the right and left directions with the finger contacting the touch panel 206 to move the contact position to the contact detection position 213c depicted in the touch position detection 33c, the operation mode indication on the touch panel 206 depicted in the touch panel display 33f is fixed to the preset focusing mode indication "PF" regardless of the position of the contact detection position 213c in the upward and downward directions, and preset value "∞" which corresponds to the contact detection position 213c is displayed with the selection frame 216. Then, as depicted in the touch panel operation display 33i, the operation mode indicator 116 on the rear monitor 105 is also fixed to the preset focusing mode indication "PF", and the display position of the selection frame 120 of the preset value indicator 117p is changed to the position of the preset value "∞". If the finger is separated from the touch panel 206 in this state, the selection of the preset value in the already determined preset focusing mode is determined at the position of "∞", and the focusing lens 203 is driven to the position of "∞".

The operations of a touch panel according to the present embodiment 3 will be explained in detail with reference to the flowchart of FIGS. 19A, 19B, 19C, 19D. FIGS. 19A, 19B, 19C, 19D are flowcharts explaining an example of the processes related to preset operations of an interchangeable lens according to embodiment 3 of the present invention. The operations in steps S531-S533 are similar to those in steps S131-S133, and thus the detailed explanation will be omitted. If it is detected that a finger contacts touch position detection areas for selecting operational setting defined in the divided areas for operation mode selection 214a-214c and the divided areas for operational setting value selection 215a-215d, the operation proceeds to step S534. In step S534, the lens CPU 221 changes the touch position detection areas for operation mode selection and the touch position detection areas for operational setting selection which are set by the divided areas for operation mode selection 214a-214c and the divided areas for operational setting value selection 215a-215e before the contact is detected, as depicted in the touch position detection area 33a of FIG. 18A, to the touch position detection areas for operation mode selection which are only based on the setting of the divided areas for operation mode selection 214a-214c, with reference to the first contact detection position 213a detected in step S533 as depicted in the touch position detection 33b. The set width of the divided areas for operation mode selection 214a-214c in this case is set to narrower width than the width at the time the contact is not yet made, for example, to the width of ½, such that an operation mode selection is performed with small amount of finger movement.

In step S535, the lens CPU 221 instructs the panel control circuit 228 to change the operation mode indication of the operation mode display area 206a of the touch panel 206 at a position corresponding to the area in which finger contact is detected, and the selected preset value indicator in the set value display area 206b. Moreover, the camera body CPU 121 detects an area at which contact is detected from the lens state data 231 obtained in the synchronous communication, and instructs the display circuit 128 to switch the operation mode indicator 116 displayed on the rear monitor 105 to the indication which corresponds to the detected area. Then, the selected preset value indicator which corresponds to a detected position in the set value indicator 117 is changed. For example, as depicted in the touch position detection area 33a of FIG. 18A, if the contact detection position is the contact detection position 213a within the area set by divided areas for operation mode selection 214b and the divided areas for operational setting value selection 215b, the following operations are performed. As depicted in the touch panel display 33d, the preset zoom mode indication "PZ" of the operation mode display area 206a on the touch panel 206, which corresponds to the contact detection position 213a, is changed to the reverse video which indicates the selected state. Then, preset value "30 mm" of the set value display area 206b is displayed with the selection frame 216. Moreover, as depicted in the touch panel operation display 33g, the preset zoom mode indication "PZ" is displayed at the operation mode indicator 116 on the rear monitor 105. Then, a set value in the preset zoom mode is displayed at the set value indicator 117, a preset value "30 mm" which corresponds to the contact detection position 213a is displayed with the selection frame.

In step S536, the lens CPU 221 starts the press-and-hold detection timer. In step S537, the lens CPU 221 instructs the panel control circuit 228 to determine whether the contact position of a finger is changed with reference to the touch position detection area for operation mode selection set in step S534. For example, whether or not the position is changed from an original area to a different area such as from the contact detection position 213a to the contact detection position 213b, which are depicted in the touch position detection 33b of FIG. 18B, is determined. When there is a change, the operation proceeds to step S538. When there is no change, the operation proceeds to step S540.

In step S538, the lens CPU 221 instructs the panel control circuit 228 to change the operation mode indication of the operation mode display area 206a of the touch panel 206 at a position corresponding to the area in which the contact position has been changed, and the selected preset value indicator in the set value display area 206b. Moreover, the camera body CPU 121 detects the area in which the contact position has been changed from the lens state data 231 obtained in the synchronous communication, and switches the operation mode indicator 116 displayed on the rear monitor 105 to the indication which corresponds to the detected area. Then, a preset value in the set value indicator 117 is changed to a set value of the operation mode which corresponds to the detected position.

For example, as depicted in the touch position detection 33b of FIG. 18B, if the contact detection position is changed from the contact detection position 213a within the divided areas for operation mode selection 214b to the contact detection position 213b within the divided areas for operation mode selection 214a, the following operations are performed. As depicted in the touch panel display 33e, the preset focusing mode indication "PF" is changed to the reverse video which indicates the selected state. Then, the indication of the selection frame 216 of a preset value on the touch panel 206 is moved in the upward direction just as it is, and is displayed at "3 m" in the preset focusing mode. Moreover, as depicted in the touch panel operation display 33h, the display of the operation mode indicator 116 on the rear monitor 105 is changed from the preset zoom mode indication "PZ" to the preset focusing mode indication "PF". Then, the position of the selection frame 120 within the set value indicator 117 is not changed, and only the preset value indicator is changed from a set value in the preset zoom mode to a set value in the preset focusing mode.

In step S539, the lens CPU 221 restarts the press-and-hold detection timer. In step S540, the lens CPU 221 determines whether the panel control circuit 228 has detected that a finger was separated from the touch panel 206. When it was detected, the operation returns. When it was not detected, the operation proceeds to step S541. In step S541, the lens CPU 221 determines whether the press-and-hold detection timer has measured the time for a specified period of time, for example, for two seconds or longer. When the specified period of time has passed, the operation proceeds to step S542, and the mode shifts to the operational set value selection mode. When the specified period of time has not passed, the operation returns to step S537. In step S542, the lens CPU 221 changes the touch position detection areas for selecting an operation mode which are set by the divided areas for operation mode selection 214a-214c in an operation selection mode, as depicted in the touch position detection 33b of FIG. 18B, as follows. That is, as depicted in the touch position detection 33c, the lens CPU 221 changes the touch position detection areas to the touch position detection area for selecting an operational setting value which are only based on the setting of the divided areas for operational setting value selection 215a-215d, with reference to the latest contact detection position 213b detected in step S537 as depicted in the touch position detection 33b. The set width of the divided areas for operational setting value selection 215a-215d in this case is set to narrower width than the width at the time the contact is not yet made, for example, to the width of ½, such that an operational setting value will be selected with small amount of finger movement in a similar manner to the operation selection mode in which a finger touches the operation mode display area 206a.

In step S543, the touch panel 206 set in step S538, an operation mode on the rear monitor 105, and the latest selected indication of a preset value are displayed on a continuous basis. In step S544, the lens CPU 221 starts the press-and-hold detection timer. In step S545, the lens CPU 221 instructs the panel control circuit 228 to determine whether the contact position of a finger is changed with reference to the touch position detection area for operation mode selection set in step S542. For example, whether or not the position is changed from an original area to a different area such as from the contact detection position 213b to the contact detection position 213c, which are depicted in the touch position detection 33c of FIG. 18C, is determined. When there is a change, the operation proceeds to step S546. When there is no change, the operation proceeds to step S548.

In step S546, the lens CPU 221 instructs the panel control circuit 228 to change the operation mode indication of the operation mode display area 206a of the touch panel 206 at a position corresponding to the area in which the contact position has been changed, and the selected preset value indicator in the set value display area 206b. Moreover, the camera body CPU 121 detects the area in which the contact position has been changed from the lens state data 231 obtained in the synchronous communication, and switches the operation mode indicator 116 displayed on the rear monitor 105 to the indication which corresponds to the detected area. Then, a preset value in the set value indicator 117 is changed to a set value of the operation mode which corresponds to the detected position. For example, as depicted in the touch position detection 33c of FIG. 18C, if the contact detection position is changed from the contact detection position 213b within the divided areas for operational setting value selection 215b to the contact detection position 213c within the divided areas for operational setting value selection 215d, the following operations are performed. In other words, as depicted in the touch panel display 33f, the display position of the selection frame 216 within the set value display area 206b of the touch panel 206 is changed to the position of preset value "∞" which corresponds to the contact detection position 213c in the preset focusing mode. Moreover, as depicted in the touch panel operation display 33i, the display position of the selection frame 120 in the set value indicator 117 on the rear monitor 105 is also changed to the position of "∞". In step S547, the lens CPU 221 restarts the press-and-hold detection timer. In step S548, the lens CPU 221 determines whether the panel control circuit 228 has detected that a finger was separated from the touch panel 206. When it was detected, the operation proceeds to step S549. When it was not detected, the operation proceeds to step S551. In step S549, the lens CPU 221 executes a preset operation according to a preset operation mode and a preset value in an area at which contact was detected immediately before a finger is separated from the divided areas for operational setting value selection 215a-215d. For example, when the preset operation mode is the preset focusing mode "PF", the focusing lens drive circuit 222 drives the focusing lens 203 to a preset position that corresponds to the selected distance.

In step S550, the lens CPU 221 changes the touch position detection areas for selecting an operational setting value, which was set by the divided areas for operational setting value selection 215a-215d in the operational set value selection mode as in the touch position detection 33c of FIG. 18C, as follows. That is, as depicted in the touch position detection area 33a, the touch position detection areas is changed to the setting of the touch position detection area before the contact is made, which is set by the divided areas for operation mode selection 214a-214c and the divided areas for operational setting value selection 215a-215e. In step S551, the lens CPU 221 determines whether the press-and-hold detection timer has measured the time for a specified period of time, for example, for two seconds or longer. When the specified period of time has passed, the operation proceeds to step S552, and the mode shifts to the set-value change mode. When the specified period of time has not passed, the operation returns to step S545. In step S552, the touch position detection areas for selecting an operational setting value is changed to the setting of the touch position detection area before the contact is made, in a similar manner to step S550. Steps S553-S562, steps S563-S567, and steps S568-S572 are similar to steps S142-S151, steps S152-S156, and steps S157-S161, respectively. Hence, the explanations of these steps will be omitted. According to Embodiment 3 as explained above, it becomes possible to provide the interchangeable lens 201 and the camera system 100 with good operability where it is not necessary to select an operation mode in advance before performing preset operations, and it is possible to operate a lens by sequentially selecting an operation mode to be executed and an operational setting value from two or more operation modes during the operation, while maintaining good HOLD status during the capturing process, in a similar manner to Embodiment 1.

Moreover, the setting of the touch position detection area is changed to the setting for only the operation mode selection with reference to the first contact detection position, and the set width of the areas is set to be narrower than the width of the setting before the contact is made. Accordingly, an operation mode may be selected with a smaller amount of finger movement, and the operability may be improved.

Furthermore, the setting of the touch position detection area is changed to the setting for only the operational setting value selection with reference to the contact detection position when the operation mode was selected, and the set width of the areas is set to be narrower than the width of the setting before the contact is made. Accordingly, an operational setting value may be selected with a smaller amount of finger movement, and the operability may be improved.

Embodiment 4

Figure 20B:
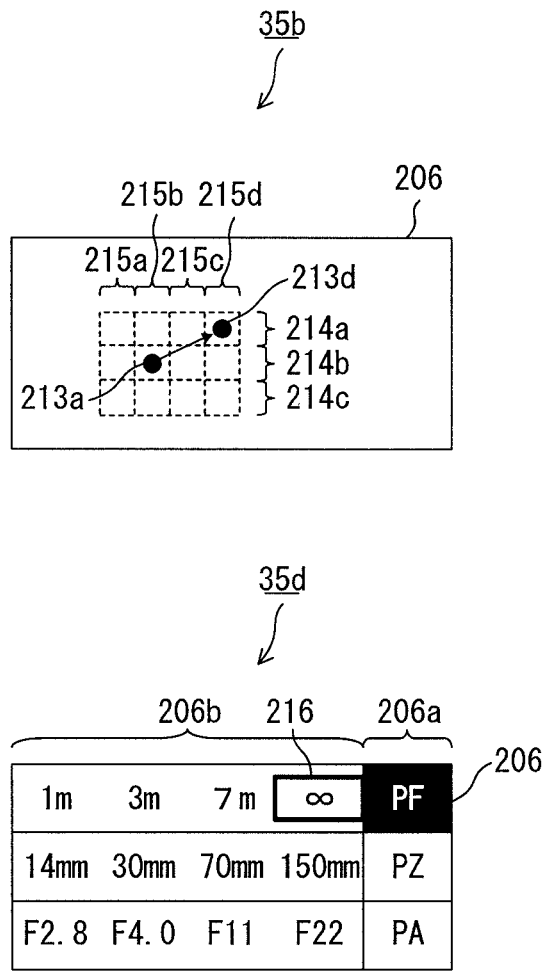

The present Embodiment 4 relates to the operations of the touch panel 206 on the interchangeable lens 201. In the present Embodiment 4, the contact position of a finger is two-dimensionally detected, and the lens is operated by selecting an operation mode by the touch position in the vertical direction and selecting a set value by the touch position in the horizontal direction at the same time. The basic configuration, capturing operation, or the like of the interchangeable lens 201 and the camera body 101 according to the present embodiment 4 are similar to those of Embodiment 1 exemplified above in FIG. 2, FIG. 3, or the like. FIGS. 20A, 20B depict an example of the touch position detection area and the display on the touch panel of the interchangeable lens according to Embodiment 4 of the present invention. A touch position detection area 35a depicts an example in which finger contact is not yet made, and a touch position detection 35b depicts an example in which an operation mode and an operational setting value are selected. A touch panel display 35c depicts an example of the display in which contact is detected for the first time from a state in which finger contact is not yet made, and a touch panel display 35d depicts an example in which an operation mode and an operational setting value are selected. A touch panel operation display 35e depicts an example of the display on the rear monitor 105 of the camera body 101 in which contact is detected for the first time from a state in which finger contact is not yet made, and a touch panel operation display 35f depicts an example of the display on the rear monitor 105 of the camera body 101 in which an operation mode and an operational setting value are selected. In regard to the operation mode indicator 116 and the set value indicator 117 on the touch panel operation displays 35e and 35f, refer to the explanations of FIG. 8. In regard to the selection frame 120, refer to the explanations of FIGS. 18A, 18B, 18C.

In regard to the touch panel 206 of the touch position detection area 35a to the touch panel display 35d, refer to the explanations of FIG. 2. In regard to the operation mode display area 206a and the set value display area 206b, refer to the explanations of FIG. 4. The contact detection position 213a indicates the position at which contact is detected for the first time from a state in which finger contact is not yet made. A contact detection position 213d indicates the position at which contact is detected when an operation mode and an operational setting value are selected. In regard to the divided areas for operation mode selection 214a-214c, the divided areas for operational setting value selection 215a-215e, and the selection frame 216, refer to the explanations of FIGS. 18A, 18B, 18C. When the operations on the touch panel 206 are in an enabled state, as depicted in the touch panel displays 35c and 35d of FIGS. 20A, 20B, selectable operation modes are displayed on the operation mode display area 206a of the touch panel 206. Operation modes are displayed at positions that correspond to divided areas for operation mode selection 214a-214c depicted in the touch position detection area 33a and the touch position detection area set as the divided area for operational setting value selection 215e. Moreover, selectable preset values corresponding to the operation modes are displayed in the set value display area 206b at positions that correspond to the divided areas for operation mode selection 214a-214c depicted in the touch position detection area 33a and the touch position detection areas set as divided areas for operational setting value selection 215a-215d. Then, the portions of an operation mode and a preset value selected by touch operation are displayed with the indication of the reverse video or the selection frame 216. Also on the rear monitor 105 of the camera body 101, the preset value indicator 117p that corresponds to the operation mode indicator 116 and the selection mode same as the mode selected on the touch panel 206 depicted in the touch panel operation displays 35e and 35f of FIGS. 20A, 20B is displayed, and the selected preset value is displayed with the selection frame 120.

A photographer may perform the operation of selecting an operation mode or a preset value, the operation of executing a preset operation, or the like by performing operations such as touch, slide, press-and-hold, or the like on the touch panel 206. For example, if a touch operation is performed and the contact detection position 213a depicted in the touch position detection area 35a of FIG. 20A is detected, as depicted in the touch panel display 35c, the preset zoom mode indication "PZ" corresponding to the contact detection position 213a is switched to the reverse video, and the preset value "30 mm" is displayed with the selection frame 216. Then, the preset zoom mode indication "PZ" is displayed at the operation mode indicator 116 on the rear monitor 105 as depicted in the touch panel operation display 35e, and "30 mm" of the preset value indicator 117p is displayed with the selection frame 120. Moreover, as depicted in the touch position detection 35b, touch position detection areas for selecting an operational setting value in which the area width of the divided areas for operational setting value selection 215a-215d and the divided areas for operation mode selection 214a-214c with reference to the contact detection position 213a is made narrower than before the operation is made are set. Next, if a photographer slides a finger to the upward and downward directions with the finger contacting the touch panel 206 to move the contact position to the contact detection position 213d depicted in the touch position detection 35b of FIG. 20B, the following operations are performed. In other words, as depicted in the touch panel display 35d, the preset focusing mode indication "PF" which corresponds to the contact detection position 213d is switched to the reverse video, and preset value "∞" which corresponds to the contact detection position 213d is displayed with the selection frame 216. Then, the operation mode indicator 116 on the rear monitor 105 is switched to the preset focusing mode indication "PF" as depicted in the touch panel operation display 35f, and the selection frame 120 of the preset value indicator 117p moves to preset value "∞". If the finger is separated from the touch panel 206 in this state, the selection of an operation mode and an operational setting value is determined at the position of the preset focusing mode "∞", and the focusing lens 203 is driven to the position of noon.

The operations of a touch panel according to the present embodiment 4 will be explained in detail with reference to the flowchart of FIGS. 21A, 21B, 21C.

Figure 21B:
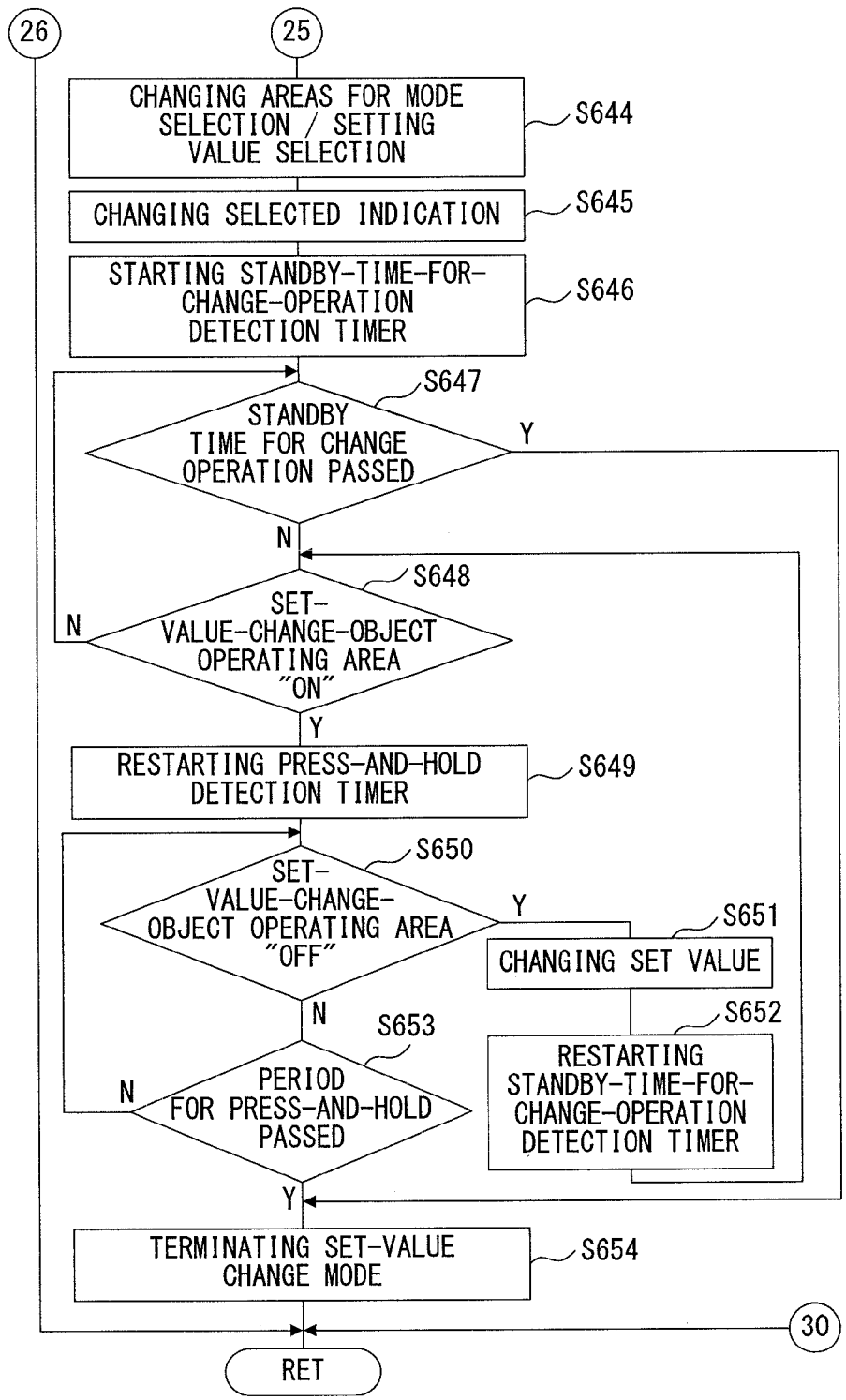
Figure 21C:
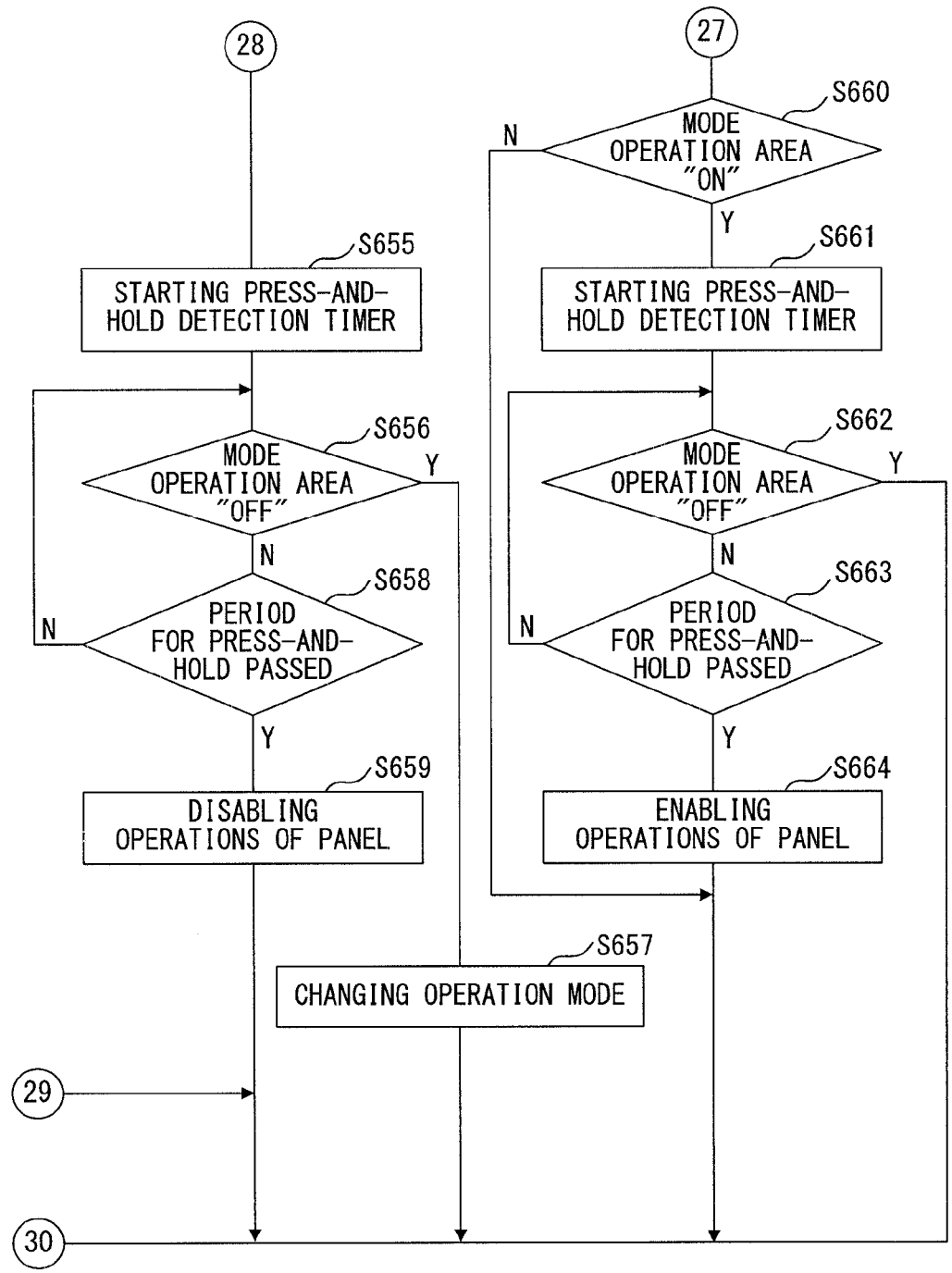

FIGS. 21A, 21B, 21C are flowcharts explaining an example of the processes related to preset operations of an interchangeable lens according to embodiment 4 of the present invention.

The operations in steps S631-S633 are similar to those insteps S131-S133, and thus the detailed explanation will be omitted. In step S634, the lens CPU 221 changes the touch position detection areas which are set by the divided areas for operation mode selection 214a-214c and the divided areas for operational setting value selection 215a-215e before the contact is detected, as depicted in the touch position detection area 35a of FIG. 20A, as follows. That is, the lens CPU 221 changes the touch position detection areas to the setting of the touch position detection areas for selecting an operational setting value which are set by the divided areas for operation mode selection 214a-214c and the divided areas for operational setting value selection 215a-215c1, with reference to the first JO contact detection position 213a detected in step S533 as depicted in the touch position detection 35b. The set width of the divided areas for operation mode selection 214a-214c and the divided areas for operational setting value selection 215a-215d in this case is set to be narrower than the width of the setting before the contact is made, for example, to the width of ½, such that an operational setting value may be selected with a smaller amount of finger movement.

In step S635, the lens CPU 221 instructs the panel control circuit 228 to change the operation mode indication of the operation mode display area 206a of the touch panel 206 at a position corresponding to the area in which finger contact is detected, and the selected preset value indicator in the set value display area 206b. Moreover, the camera body CPU 121 detects an area at which contact is detected from the lens state data 231 obtained in the synchronous communication, and instructs the display circuit 128 to switch the operation mode indicator 116 displayed on the rear monitor 105 to the indication which corresponds to the detected area. Then, the selected preset value indicator which corresponds to a detected position in the set value indicator 117 is changed. For example, if the contact detection position is "213a" as depicted in the touch position detection area 35a of FIG. 20A, the display that corresponds to the contact detection position 213a is performed as depicted in the touch panel display 35c. Moreover, the rear monitor 105 includes the display depicted in the touch panel operation display 35e. In step S636, the lens CPU 221 starts the press-and-hold detection timer. In step S637, the lens CPU 221 instructs the panel control circuit 228 to determine whether the contact position is changed with reference to the touch position detection area for selecting an operational setting value set in step S634. For example, as depicted in the touch position detection 35b of FIG. 20B, whether or not the position is changed such as from the contact detection position 213a to the contact detection position 213d is determined. When there is a change, the operation proceeds to step S638. When there is no change, the operation proceeds to step S640.

In step S638, the lens CPU 221 instructs the panel control circuit 228 to change the operation mode indication of the operation mode display area 206a of the touch panel 206 at a position corresponding to the area in which the contact position has been changed, and the selected preset value indicator in the set value display area 206b. Moreover, the camera body CPU 121 detects the area in which the contact position has been changed from the lens state data 231 obtained in the synchronous communication, and switches the operation mode indicator 116 displayed on the rear monitor 105 to the indication which corresponds to the detected area. Then, a preset value in the set value indicator 117 is changed to a set value of the operation mode which corresponds to the detected position. For example, as depicted in the touch position detection 35b of FIG. 20B, if the contact detection position is changed from the contact detection position 213a within the area set by divided areas for operation mode selection 214b and the divided areas for operational setting value selection 215b to the contact detection position 213d within the area set by the divided areas for operation mode selection 214a and the divided areas for operational setting value selection 215d, the following operations are performed. That is, as depicted in the touch panel display 35d, display is made in a corresponding manner to the contact detection position 213d. Moreover, as depicted in the touch panel operation display 35f, the display of the operation mode indicator 116 on the rear monitor 105 is changed. In step S639, the lens CPU 221 restarts the press-and-hold detection timer for producing a decision to shift to the set-value change mode. In step S640, the lens CPU 221 determines whether the panel control circuit 228 has detected that a finger was separated from the touch panel 206. When it was detected, the operation proceeds to step S641. When it was not detected, the operation proceeds to step S643. In step S641, the lens CPU 221 executes a preset operation according to a preset operation mode and a preset value in an area at which contact was detected immediately before a finger is separated from the touch panel 206.

In step S642, the lens CPU 221 changes the touch position detection areas for selecting an operational setting value, which was set by the divided areas for operation mode selection 214a-214c and the divided areas for operational setting value selection 215a-215d in the operational set value selection mode as in the touch position detection 35b of FIG. 20B, to the setting of the touch position detection area before the contact is made as depicted in the touch position detection area 35a. In step S643, the lens CPU 221 determines whether the press-and-hold detection timer has measured the time for a specified period of time, for example, for two seconds or longer. When the specified period of time has passed, the operation proceeds to step S644, and the mode shifts to the set-value change mode. When the specified period of time has not passed, the operation returns to step S637. In step S644, the touch position detection areas for selecting an operational setting value is changed to the setting of the touch position detection area before the contact is made, in a similar manner to step S642. Steps S645-S654, steps S655-S659, and steps S660-S664 are similar to steps S142-S151, steps S152-S156, and steps S157-S161, respectively. Hence, the explanations of these steps will be omitted.

According to Embodiment 4 as explained above, it becomes possible to provide the interchangeable lens 201 and the camera system 100 with good operability where it is not necessary to select an operation mode in advance before performing preset operations, and it is possible to operate a lens by sequentially selecting an operation mode to be executed and an operational setting value from two or more operation modes during the operation, while maintaining good HOLD status during the capturing process, in a similar manner to Embodiment 1.

Moreover, the setting of the touch position detection area is changed to the setting for selection an operation mode and an operational setting value with reference to the first contact detection position, and the set width of the areas is set to be narrower than the width of the setting before the contact is made. Accordingly, an operation mode and an operational setting value may be selected with a smaller amount of finger movement, and the operability may be improved.

According to the embodiments of the present invention as explained in the above, it becomes possible to record high-quality video where unnecessary operational noise is suppressed during the recording operation and unnatural change in an image is small, and to provide an interchangeable lens and a camera system with good operability during the capturing process.

It should be understood that the present invention is not limited to the configuration exemplified in the embodiments above, and it is needless to say that various types of modifications can be made without departing from the spirit or scope of the invention.

What is claimed is:

1. An interchangeable lens mounted on a camera body in an exchangeable manner, the interchangeable lens comprising:
   an optical system in which a state of a subject light flux incident to the mounted camera body is adjustable by changing an optical state;
   a contact position detecting unit with a detection plane, which detects a contact state including a contact and a contact position of a finger of a photographer, to detect a contact position on the detection plane in an approximately same direction as an optical axis direction of the optical system,
      wherein the detection plane comprises a first area and a second area which are obtained by dividing the detection plane in approximately the same direction as the optical axis direction; and
   a lens controller to control an optical state of the optical system according to a contact state of the finger including the contact position detected by the contact position detecting unit, wherein the lens controller:
      sets an operational setting value according to an existence of a contact on the first area of the detection plane and a detection result on a contact position in the optical axis direction by the contact position detecting unit, and controls an optical state of the optical system according to the operational setting value; and
      sets an operation mode according to a detection result on an existence of a contact on the second area of the detection plane by the contact position detecting unit, and controls the contact position detecting unit such that the operational setting value corresponding to the set operation mode becomes configurable by a contact on the detection plane.

2. The interchangeable lens according to claim 1, further comprising an indicator provided near the detection plane to let the photographer identify the contact position on the contact position detecting unit by a sense of touch.

3. The interchangeable lens according to claim 2, wherein the indicator includes at least one of a protrusion, a groove, a braille, and a combination of a rough surface and a gloss surface.

4. The interchangeable lens according to claim 1, wherein the optical system includes a group of focusing lenses adjusting a focal point, a group of zoom lenses adjusting a focal length, and a stop unit regulating a light flux incident to the camera body, and
   the operation mode includes a focal point adjusting operation mode to move the group of focusing lenses, a zoom adjusting operation mode to move the group of zoom lenses, and a stop adjusting operation mode to adjust an aperture of the stop unit.

5. The interchangeable lens according to claim 1, further comprising
   a lens-side display unit arranged near the contact position detecting unit or integrated into the contact position detecting unit,
   wherein
   the lens controller controls the operation mode to be displayed on the lens-side display unit.

6. The interchangeable lens according to claim 1, wherein the optical system includes a group of focusing lenses adjusting a focal point, a group of zoom lenses adjusting a focal length, and a stop unit regulating a light flux incident to the camera body, and the operational setting value includes a focal point adjusting position corresponding to a movement of the group of focusing lenses, a zoom position corresponding to a movement of the group of zoom lenses, and a stop position corresponding to an aperture of the stop unit.

7. The interchangeable lens according to claim 1, further comprising a lens-side display unit arranged near the contact position detecting unit or integrated into the contact position detecting unit, wherein the lens controller controls the operational setting value to be displayed on the lens-side display unit.

8. An interchangeable lens mounted on a camera body in an exchangeable manner, the interchangeable lens comprising:

an optical system in which a state of a subject light flex incident to the mounted camera body is adjustable by changing an optical state;

a contact position detecting unit with a detection plane, which detects a contact state including a contact and a contact position of a finger of a photographer, to detect a contact position on the detection plane in an approximately same direction as an optical axis direction of the optical system; and a lens controller to control an optical state of the optical system according to a contact state of the finger including the contact position detected by the contact position detecting unit, wherein, the contact position detecting unit is capable of detecting a change in a contact position on the detection plane in an approximately orthogonal direction to an optical axis direction of the optical system, and wherein, the lens controller sets an operation mode to control an optical state of the optical system according to the change in the contact position detected by the contact position detecting unit with respect to one of directions which are approximately orthogonal to the approximately same direction as the optical axis direction, and sets an operational setting value which corresponds to the operation mode according to the change in the contact position in another direction.

9. The interchangeable lens according to claim 8, wherein the contact position detecting unit is capable of changing a range of an area in which a contact on the detection plane position is detected when the operation mode and the operational setting value are set according to a change in a contact position, and controls the range to be narrower when a contact is detected than when a contact is not detected.

10. An interchangeable lens mounted on a camera body in an exchangeable manner, the interchangeable lens comprising:

an optical system in which a state of a subject light flux incident to the mounted camera body is adjustable;

a lens communication unit to communicate with the camera body;

a contact position detecting unit with a detection plane, which detects a contact state including a contact and a contact position of a finger of a photographer, to detect a contact position on the detection plane in an approximately same direction as an optical axis direction of the optical system, wherein the detection plane comprises a first area and a second area, which are obtained by dividing the detection plane in the approximately same direction as the optical axis direction; and a lens controller to control the lens communication unit to obtain capture control information from the camera body, to change the capture control information according to a contact state of the finger including the contact position detected by the contact position detecting unit, and to control the lens communication unit to transmit the changed capture control information to the camera body, wherein the lens controller:

sets a set value of an operation mode of the camera body as the capture control information according to an existence of a contact on a first area of the detection plane and a detection result on a contact position in the optical axis direction by the contact position detecting unit; and sets an operation mode according to a detection result on an existence of a contact on a second area of the detection plane by the contact position detecting unit, and controls an operational setting value corresponding to the set operation mode to be configurable by a contact on the detection plane.

11. The interchangeable lens according to claim 10, further comprising an indicator provided near the detection plane to let the photographer identify the contact position on the contact position detecting unit by a sense of touch.

12. A camera system including a camera body and an interchangeable lens mounted on the camera body in an exchangeable manner, the interchangeable lens comprising:

an optical system in which a state of a subject light flux incident to the mounted camera body is adjustable by changing an optical state;

a lens communication unit to communicate with the camera body;

a contact position detecting unit with a detection plane, which detects a contact state including a contact and a contact position of a finger of a photographer, to detect a contact position on the detection plane in an approximately same direction as an optical axis direction of the optical system, wherein the detection plane comprises a first area and a second area which are obtained by dividing the detection plane in the approximately same direction as the optical axis direction; and a lens controller to perform at least one of a control operation of the optical system according to a contact state of the finger including the contact position detected by the contact position detecting unit and a transmission operation of optical system control information to the camera body by the lens communication unit, or a change operation of capture control information according to the contact state and a transmission operation of the capture control information to the camera body by the lens communication unit, wherein the lens controller:

sets a set value of an operation mode of the camera body as the capture control information according to an existence of a contact on a first area of the detection plane and a detection result on a contact position in the optical axis direction by the contact position detecting unit; and sets an operation mode according to a detection result on an existence of a contact on a second area of the detection plane by the contact position detecting unit, and controls an operational setting value corresponding to the set operation mode to be configurable by a contact on the detection plane, and the camera body comprising:
- a main body storage unit to store the optical system control information or the capture control information;
- a main body communication unit to communicate with the interchangeable lens; and
- a main body controller to store in the main body storage unit the optical system control information or the capture control information obtained by the main body communication unit.

13. The camera system according to claim 12, further comprising an indicator provided near the detection plane to let the photographer identify the contact position on the contact position detecting unit by a sense of touch.

14. The camera system according to claim 12, further comprising
- a main body display unit to obtain and display an image of the subject light flux incident through the interchangeable lens, wherein the main body controller displays the optical system control information or the capture control information obtained by the main body on the main body display unit.

* * * * *